(12) United States Patent
Hesnor

(10) Patent No.: US 11,429,760 B2
(45) Date of Patent: Aug. 30, 2022

(54) QR CODED CONSTRUCTION DRAWINGS

(71) Applicant: Todd Hesnor, Ballston Lake, NY (US)

(72) Inventor: Todd Hesnor, Ballston Lake, NY (US)

(*) Notice: Subject to any disclaimer, the term of this patent is extended or adjusted under 35 U.S.C. 154(b) by 0 days.

(21) Appl. No.: 17/224,475

(22) Filed: Apr. 7, 2021

(65) Prior Publication Data

US 2021/0312100 A1     Oct. 7, 2021

Related U.S. Application Data

(60) Provisional application No. 63/006,302, filed on Apr. 7, 2020.

(51) Int. Cl.
| | |
|---|---|
| *G06F 30/13* | (2020.01) |
| *G06F 30/12* | (2020.01) |
| *G06Q 30/08* | (2012.01) |
| *G06K 19/06* | (2006.01) |

(52) U.S. Cl.
CPC .............. *G06F 30/13* (2020.01); *G06F 30/12* (2020.01); *G06K 19/06037* (2013.01); *G06Q 30/08* (2013.01)

(58) Field of Classification Search
CPC ... G06F 30/13; G06F 30/12; G06K 19/06037; G06Q 30/08
USPC ............................................................ 701/1
See application file for complete search history.

(56) References Cited

U.S. PATENT DOCUMENTS

| | | | | |
|---|---|---|---|---|
| 5,331,547 A | * | 7/1994 | Laszlo | .................. G06F 3/0481 705/2 |
| 5,493,106 A | * | 2/1996 | Hunter | ............. G07B 17/00661 235/375 |
| 6,068,188 A | * | 5/2000 | Knowles | ........... H04L 29/12594 235/462.01 |
| 6,842,760 B1 | * | 1/2005 | Dorgan | .................. G06Q 10/06 700/100 |
| 8,720,771 B2 | | 5/2014 | MacKinnon | |
| 9,424,374 B2 | * | 8/2016 | Vanker | .................... G06F 30/13 |
| 9,824,349 B2 | | 11/2017 | Xing et al. | |
| 10,504,103 B2 | | 12/2019 | DeSoto et al. | |
| 2006/0049261 A1 | * | 3/2006 | Stadtler | .............. G05B 19/0426 235/462.15 |

(Continued)

OTHER PUBLICATIONS

Hedge, Apoorva, QR Codes in Construction: How Do They Help?, Beaconstac.com, available at https://web.archive.org/web/20200516214827/https://blog.beaconstac.com/2020/03/qr-codes-in-construction/ (updated Apr. 13, 2020).*

(Continued)

*Primary Examiner* — Sherief Badawi
*Assistant Examiner* — Conrad R Pack
(74) *Attorney, Agent, or Firm* — Bond Schoeneck and King PLLC; David Nocilly

(57) ABSTRACT

A system, method and program product for generating and processing 2D barcodes on construction drawings. One embodiment of the method includes generating a plurality of 2D barcodes related to a construction project. Selecting a canvas that includes a plurality of regions to populate with the 2D barcodes, and populating the canvas with each barcode in a respective region. Outputting a print-ready image of the canvas containing the 2D barcodes. Executing a remote data processing system in response to a user scanning one of the 2D barcodes on the canvas with a mobile device to load a web application to facilitate a construction project task.

12 Claims, 22 Drawing Sheets

(56) References Cited

U.S. PATENT DOCUMENTS

| | | | | |
|---|---|---|---|---|
| 2010/0280918 | A1* | 11/2010 | Balent | G06Q 30/06 |
| | | | | 705/26.81 |
| 2011/0276886 | A1* | 11/2011 | Hall | G06Q 10/06 |
| | | | | 715/734 |
| 2013/0132440 | A1* | 5/2013 | Carlson | G06F 16/951 |
| | | | | 707/792 |
| 2013/0198039 | A1* | 8/2013 | Sridharan | G06Q 30/0613 |
| | | | | 705/26.44 |
| 2014/0240735 | A1* | 8/2014 | Salgado | G06F 3/1242 |
| | | | | 358/1.13 |
| 2017/0242863 | A1 | 8/2017 | Dorairajan et al. | |
| 2017/0289348 | A1* | 10/2017 | Chekmarov | H04M 3/42382 |
| 2018/0322225 | A1* | 11/2018 | Schwartz | G06K 7/1413 |
| 2018/0365704 | A1* | 12/2018 | Atkinson | G06Q 10/0832 |
| 2020/0042915 | A1* | 2/2020 | Samson | G06Q 10/0635 |
| 2021/0303748 | A1* | 9/2021 | Malekian | G06T 19/006 |

OTHER PUBLICATIONS

Nerd, Niles, QR codes in Construction Industry, Nerds on Site, available at https://www.nerdsonsite.com/blog/qr-codes-in-construction-industry/ (Mar. 20, 2012).*

Rizwan, Zara, QR Codes in Construction: A List of 3 Diverse Use Cases, Scanova Blog, available at https://scanova.io/blog/blog/2017/03/30/qr-codes-construction/ (Mar. 30, 2017).*

Walmsley, Kean, Future Plugin of the Month to embed QR Codes in AutoCAD Drawings?, Through the Interface, available at https://www.keanw.com/2010/06/future-plugin-of-the-month-to-embed-qr-codes-in-autocad-drawings.html (Jun. 30, 2010).*

* cited by examiner

QR CODED CONSTRUCTION DRAWINGS

TECHNICAL FIELD

The subject matter of this invention relates to barcodes and more particularly to a system and method of generating and presenting an arrangement of multiple barcodes that will be utilized in the building design and construction industry.

BACKGROUND

A Quick Response code (QR code) is a type of two-dimensional, machine-readable optical label that contains data. A QR code consists of a plurality of black squares arranged in a square grid on a white background that is read by an imaging device such as a camera. The data is extracted from patterns that are present in both horizontal and vertical components of the image. QR code applications have historically been utilized to elicit simple tasks such as product tracking, item identification, providing contact information and providing browser direction to a website for marketing purposes.

SUMMARY

Aspects of the disclosure provide a method and system to generate an arranged plurality of barcodes. Each barcode, of the arranged plurality of barcodes, is associated with a service available via a computing system (e.g., data stored on a computer readable storage medium, a program executable by a processor, etc.).

A first aspect discloses a method that includes creating a construction project, wherein the construction project includes a plurality of barcode categories selectable by a user and at least one of the barcode categories includes a documentation category; generating a plurality of two-dimensional (2D) barcodes for the construction project, wherein at least one of the 2D barcodes includes a documentation barcode associated with a location for storing construction files, wherein construction files are uploadable to the location via a web interface; defining a layout and populating the layout with the plurality of 2D barcodes; outputting a digital file containing the layout; and loading a web application on a mobile computing device in response to a remote user scanning one of the plurality of 2D barcodes with the mobile computing device, wherein scanning of the documentation barcode provides access to uploaded construction files via the web application.

A second aspect discloses a system comprising: a memory; and a processor coupled to the memory and configured to perform a process that includes: creating a construction project, wherein the construction project includes a plurality of barcode categories selectable by a user and at least one of the barcode categories includes a documentation category; generating a plurality of two-dimensional (2D) barcodes for the construction project, wherein at least one of the 2D barcodes includes a documentation barcode associated with a location for storing construction files, wherein construction files are uploadable to the location via a web interface; defining a layout and populating the layout with the plurality of 2D barcodes; outputting a digital file containing the layout; and loading a web application on a mobile computing device in response to a remote user scanning one of the plurality of 2D barcodes with the mobile computing device, wherein scanning of the documentation barcode provides access to uploaded construction files via the web application.

A third aspect discloses a computer-implemented method, comprising: creating a construction project, wherein the construction project includes a plurality of barcode categories selectable by a use, wherein the barcode categories include a documentation category, a communication category, and a safety category; generating a plurality of two-dimensional (2D) barcodes for the construction project, wherein the 2D barcodes include a documentation barcode associated with a first location for storing construction files, wherein construction files are uploadable to the location via a web interface, a communication barcode associated with a communication service and a safety barcode associated with a second location for storing safety information; defining a layout and populating the layout with the plurality of 2D barcodes; outputting a digital file containing the layout; and loading a web application on a mobile computing device in response to a remote user scanning one of the plurality of 2D barcodes with the mobile computing device, wherein scanning of the documentation barcode provides access to uploaded construction files via the web application, scanning the communication barcode triggers a two-way communication between the remote user and a third party, and scanning safety barcode provides access to the safety information.

BRIEF DESCRIPTION OF THE DRAWINGS

These and other features of this invention will be more readily understood from the following detailed description of the various aspects of the invention taken in conjunction with the accompanying drawings in which:

FIG. 11 shows an arranged plurality of barcodes according to embodiments.

FIG. 13 shows an arranged plurality of barcodes according to embodiments.

Figure 1:
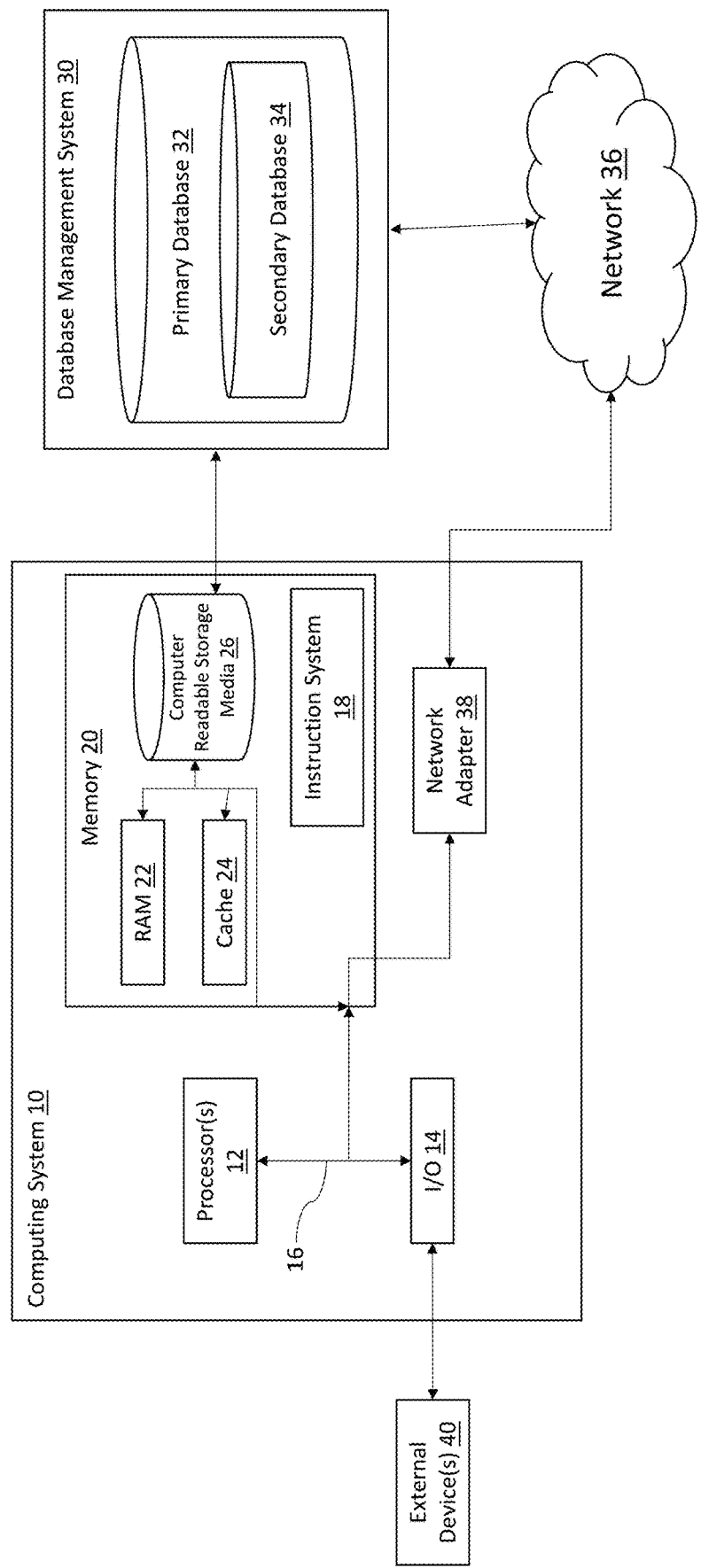
FIG. 1 shows a computing system and related components according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The term "construction personnel" generally includes the project contractor(s), subcontractor(s), project manager(s), foreman, supervisor(s), administrator(s), equipment vendor(s), equipment manufacturer(s), construction manager(s), design builder(s), etc.

The term "design professional" generally includes the project architect(s), engineer(s), land surveyor(s), design-build professional(s), and/or any user(s) responsible for producing and distributing a design drawing or set of drawings intended to be utilized for construction purposes.

The term "project owner" generally refers to any stakeholder, including the individual(s) funding the respective project, the private company(s) funding the respective project, the public company(s) funding the respective project, the government entity(s) funding the respective project, etc.

The term "design document" generally includes a document, or collection of documents, drawing(s), sketch(es), specification(s), addenda, detail(s), equipment schedule(s), etc. created by a design professional to assist construction personnel in carrying out a task, or collection of tasks, related to a construction project.

The term "barcode" generally refers to a method of representing data in a visual, machine-readable form. The form may include, but not be limited to, one-dimensional (1D) and two-dimensional (2D) barcodes.

The term "unique web resource" generally includes a computer network retrievable electronic file, document, or computer program code given identity in the form of a uniform resource locator (URL).

One aspect of the present invention pertains to the generation of a plurality of unique QR codes, based on one or more user inputs, and an arrangement of the plurality of QR codes (hereinafter, sometimes referred to as a "QR Arrangement"). A QR Arrangement may be comprised of static QR codes, dynamic QR codes, or a combination of static and dynamic QR codes.

A QR Arrangement may be digitally affixed to one or more electronic design documents. A digitally affixed QR Arrangement may be in any suitable digital file format including, but not limited to, the following digital file formats: SVG, DWG, DWF, PDF, JPG, DWT, RVT, RFA, RTE, RFT, DOC, XLS, XLSX, TIF, PNG, BMP, and GIF, etc. Additionally, a QR Arrangement may be physically printed or affixed to one or more design documents, e.g., via an adhesive backed film, paper, tape, etc.

One or more embodiments of the present invention enable construction personnel (e.g., a remote user) to scan a respective barcode, of an arranged plurality of barcodes, to trigger a pre-programmed sequence of events that may be utilized to accomplish one or more of the following services, including: (i) provide construction personnel with project safety-related information; (ii) streamline communication between a design professional and construction personnel; (iii) change project-related documentation between a design professional and construction personnel; (iv) increase overall productivity on a construction worksite; (v) order project-related materials, equipment, etc.; (vi) obtain project-related labor, services, etc.; (vii) make project-related submissions; (viii) view project-related documents; (ix) view project-related pictures, video, or other media; (x) upload project-related pictures, video, or other media; (xi) upload construction files related to a construction project; (xii) complete and submit project-related forms, reports, etc.; (xiii) issue construction-related directives from the design professional to construction personnel; (xiv) view contact information associated with all members of the project team; (xv) complete and submit daily logs, incident reports, etc.; (xvi) initiate a request for information; and (xvii) conduct a construction related bidding process.

One or more embodiments of the present invention would enable a project owner to scan a respective barcode, of an arranged plurality of barcodes, to trigger a pre-programmed sequence of events that would be utilized to view one or more project documents. The project documents may include, but are not limited to, one or more of the following: (i) design drawings; (ii) specifications; (iii) addenda; (iv) record drawings; (v) approved equipment submittals; (vi) equipment operations and maintenance manuals; (vii) equipment start-up reports; (viii) equipment demonstration and training reports; (ix) equipment spare parts; (x) equipment preventative maintenance instructions; (xi) balancing reports; (xii) material safety data sheets; (xiii) commissioning checklists; (xiv) associated sustainability-related documentation; and (xv) equipment warrantees.

One or more embodiments of the present invention may enable a person (e.g., a remote user) to scan a respective barcode, of an arranged plurality of barcodes, to trigger a pre-programmed sequence of events that may access one or more general requirement submittals. The general requirement submittals may include, but are not limited to, one or more of the following: (i) permits; (ii) workers compensation certificate schedule, (iii) equal employment opportunity affidavit; (iv) minority business enterprise affidavit; (v) performance bond form; (vi) payment bond form; (vii) certificate of insurance form; (viii) certificate of substantial completion form; (ix) affidavit of release of liens form; (x) record change order requests; (xi) record change orders; (xii) schedule of values; (xiii) progress payment procedures; (xiv) project meetings; (xv) construction progress reporting; (xvi) photographic documentation; (xvii) code-required special inspections and procedures; (xviii) final cleaning; (xix) completion and correction list; and (xx) project record documents.

One or more embodiments of the present invention may enable a person to scan a respective barcode, of an arranged plurality of barcodes, to trigger a pre-programmed sequence of events that may access one or more shop drawing submittals. The shop drawing submittals may include, but are not limited to, one or more of the following: (i) material safety data sheets; (ii) starting and adjusting; (iii) maintenance contracts; (iv) operation data; (v) maintenance data; (vi) preventative maintenance instructions; (vii) warranties; (viii) spare parts; (ix) extra stock materials; (x) demonstration and training; and (xi) the shop drawing submittal itself.

One or more embodiments of the present invention enable scanning of a respective barcode, of an arranged plurality of barcodes, to trigger a pre-programmed sequence of events that may be utilized to accomplish one or more of the following services, including: (i) solicit or provide marketing and/or advertising related content; (ii) elicit one-way communication, wherein the individual scanning the respective barcode would gain relevant project information in real-time on a mobile device; (iii) elicit two-way communication, wherein the individual scanning the respective barcode would access a fillable form on their mobile device for real-time submission to a design professional; and (iv) solicit competitive bidding for construction related services.

An illustrative embodiment of the present invention is used in the design and construction industry. Alternatively, embodiments of the present invention may be used in other industries, including: (i) finance; (ii) banking; (iii) manufacturing; (iv) retail commerce; (v) e-commerce; (vi) maintenance; (vii) estate planning; and (viii) residential maintenance.

In some embodiments, at least one barcode, of an arranged plurality of barcodes, may trigger a computerized service to solicit competitive bidding for one or more construction related services. The construction related services may include, but are not limited to, one or more of the following: (i) construction materials; (ii) construction equipment; and (iii) construction labor. For example, a QR code pre-programmed to solicit competitive bidding is scanned by a construction personnel with a mobile device. In one example, the construction personnel is directed to a form that prompts the construction personnel to select and edit the construction related service requested (e.g., purchase electrical wiring). The form is automatically sent to one or more parties that provide the requested construction related service (e.g., sellers of electrical wiring). Any proposal to the request for the construction related service is sent to the construction personnel for review to accept or reject the proposal (e.g., all bids and relevant information for the sale of electrical wiring are forwarded to the construction personnel).

In some embodiments, a plurality of barcodes will be arranged in one or more of the following ways, including: (i) an array; (ii) a matrix; (iii) a strip(s); (iv) a block(s); and (v) a schedule(s), etc.

The invention, in one aspect, features a computer algorithm that, based on user input, generates an arrangement of multiple, unique, non-related barcodes, which are subsequently transmitted to a design professional. The design professional may attach the barcode arrangement to one or more design document(s) as a means towards facilitating digital conveyance and collection of project-related information and services between the design professional and construction personnel.

In some embodiments, the barcodes would be scanned via the utilization of a mobile device.

In some embodiments, the barcode's service and/or arrangement would be customized utilizing input from a design professional. Alternatively, a barcode's service and/or arrangement would be predetermined and would not be customizable by a design professional.

In some embodiments, the term "multiple QR codes" shall mean the grouping, combining, assemblage, etc. of more than one QR code into an arrangement.

In some embodiments, the project team shall include, but not be limited to the project owner, design professionals, construction personnel, etc.

In some embodiments, the transmission of the QR arrangement may include, but not be limited to digital distribution, US Postal Service, Fed-Ex, UPS, etc.

One or more embodiments of the present invention may use an Application Program Interface ("API") to create at least a first barcode of a plurality of barcodes. In one embodiment, a user creates a first QR code by sending a Hyper Text Transfer Protocol ("HTTP") Request to a URL associated with the API. The HTTP Request contains a request body, wherein the request body is further comprised of one or more parameters. The parameters comprise the data that are embedded within the first QR code. The parameters may be provided to the API (through the request body) in any format that the API is configured to receive (e.g., JSON format). For example, a user sends a HTTP Request to an API with a request body that contains JSON formatted parameters to submit a request for information from a design professional. The API receives the request, then generates and returns a QR code with the data that, when scanned, provides an appropriate form to initiate the request for information process.

Alternatively, a user may create a plurality of QR codes by sending an HTTP Request to a URL associated with an API. The HTTP Request is further comprised of a request body, wherein the request body contains a plurality of parameter sets. Each parameter sets, of the plurality of parameter sets, corresponds to a unique QR code to be generated. The API receives the HTTP Request, generates a plurality of unique QR codes, arranges the plurality of unique QR codes, and outputs the arranged plurality of unique QR codes.

As a further alternative embodiment, a user selects one or more inputs through a Graphical User Interface (GUI) to output a plurality of arranged QR codes. A computer program product (CPP) receives the user inputs through the GUI. The CPP configures the inputs to be compatible with at least a first API. The CPP transmits the inputs through the first API. The first API receives the inputs and generates an arranged plurality of QR codes. The generated arranged plurality of QR codes are sent to the user (or source(s) determined by the user) and accessible through the GUI.

As a further alternative embodiment, a first user inputs at least a first input of a plurality of inputs to a CPP. The CPP generates at least a first QR code of a plurality of unique QR codes using a library stored on a computer readable storage. The CPP generates an Extensible Markup Language (XML) file for the first QR code. The CPP sends the XML file through an HTTP Request to a first cloud location. The first cloud location receives and stores the XML file. The first cloud location transmits the XML file (and the first QR code that the XML file represents) to a second cloud location. The second cloud location receives the XML file and transforms/inserts the XML file into a Hyper Text Markup Language (HTML) template. The HTML template arranges the first QR code for display at a first URL. The first URL is returned to the first user through the second cloud location.

In an illustrative approach, a backend computer system (system) may be prepopulated with information about a particular project, e.g., based on inputs from the user or from other sources, including submittals, documents, etc. The system may also provide processes, such as bidding, scheduling and payment processes that facilitate a construction project. For example a web interface may be provided that allows users to upload construction files, safety content, invoicing/billing records, etc., as the project progresses.

In one or more embodiments, a user generates a plurality of unique barcodes that are transmitted to, and stored on, a database for a construction project (e.g., a "project database"). In the present embodiment, a first user generates a plurality of unique QR codes by submitting a plurality of inputs through a GUI of a web application. The web application generates a plurality of SVG elements by encoding the plurality of inputs. Each SVG element may represent a unique QR code of the plurality of unique QR codes. The plurality of SVG elements are associated with at least a first user identifier (ID) and a first project ID, wherein the first user ID is a unique identifier that corresponds to the first user and the first project ID corresponds to a specified construction project. In the present embodiment, the first user ID and the first project ID are inputs from the first user to identify specific groups of data (e.g., a plurality of QR codes associated with a specific project) that may be stored within a first database—such as, e.g., a relational database. The plurality of SVG elements, the first user ID and the first project ID (collectively, the "First QR Arrangement Data") are transmitted to the first database through a first transmission method. The first transmission method is a computer-implemented method of sending data (e.g., the First QR Arrangement Data) to the first database. In the present embodiment, the first database has a first database table and a second database table. The first database table stores information about a user (e.g., the first user ID) and a specific project (e.g., the first project ID). The second database table stores information related to a specific project (e.g., the plurality of SVG elements associated with the first project ID). Alternatively, all data associated with a generated plurality of QR codes (e.g., First QR Arrangement Data) are stored in a single database table. For example, a database table contains a user ID, a project ID, and three SVG elements.

As a further alternative embodiment, each SVG element may include a metadata profile. The metadata profile may include one or more metadata tags such as: (i) size data; (ii) color data; (iii) positional data; (iv) orientation data; (v) URL data—e.g., a unique web resource; (vi) source data; (viii) categorical data; (ix) contact data, and (x) text data. A computer-implemented method may generate an arrangement of QR codes by processing the metadata profile to position, orient, and/or display a respective SVG element in relation to other SVG elements of the plurality of SVG elements. For example, a first SVG element, a second SVG element, and a third SVG element (collectively, the "Three SVG Elements") are used to generate an arrangement of the Three SVG Elements. The Three SVG Elements correspond to three unique QR codes that are generated from a plurality of user inputs. The Three SVG Elements contain metadata that includes X-Y coordinates to indicate positions of each SVG element relative to each other. The first SVG element has metadata that includes X-Y coordinates of (0, 0). The second SVG element has metadata that includes X-Y coordinates of (5, 0). The third SVG element has metadata that includes X-Y coordinates of (10, 0). The Three SVG Elements, and respective metadata associated with each SVG element, are processed by a computer-implemented method configured to display the each SVG Element on a digital canvas (i.e., layout) at a respective X-Y coordinate position specified by the metadata. As a result, the Three SVG Elements are displayed in a horizontal line along the X-axis (e.g., a webpage displays three QR codes positioned along a straight line).

As a further alternative embodiment, the plurality of unique barcodes are stored in any suitable digital file format, and not limited to SVG format. For example, three QR codes are stored as PNG files and arranged in a straight line on a digital canvas.

In one embodiment, a user generates a plurality of two-dimensional barcodes by engaging a spreadsheet application on a computing device. In the present embodiment, a user enters a plurality of inputs into at least a first form template through a graphical user interface of a compatible spreadsheet application. The user executes a computer-implemented submission method in which the plurality of user inputs from the first form (or plurality of forms) are stored and processed. The plurality of user inputs may be stored locally and/or in a project database. The plurality of user inputs may be processed to generate a plurality of unique web resources. Each unique web resource, or portions of each unique web resource, may be encoded to generate a unique barcode. A plurality of unique barcodes may be arranged on a digital canvas based on the plurality of unique web resources encoded within and/or a canvas template to arrange each barcode. The digital canvas may be transmitted, or otherwise made available to, the user(s) for subsequent use in a construction project.

In some embodiments, a user generates a plurality of unique QR codes by submitting on a plurality of inputs on a mobile computing device. Alternatively, a user generates a plurality of unique QR codes by submitting a plurality of inputs through a web application, desktop application, an API, or otherwise digitally transmits construction project data.

In some embodiments, a user engages a web application to create a construction project directory on a computer readable storage medium that is associated with a specific construction project. The construction project directory including at least one sub-directory that is accessible at a unique web resource. The at least one sub-directory configured to receive and store a set of construction project files throughout the duration of a given construction project. Authorized users may upload or revise construction project files to the at least one sub-directory as construction project tasks are completed. The at least one sub-directory may be accessed by scanning a barcode that is generated by encoding a unique web resource that directs a computing device to the at least one sub-directory in response to scanning the barcode. A barcode configured to access the at least one sub-directory in response to scanning may yield a real-time update on the status of a respective construction project task. A barcode configured to access the at least one sub-directory may access a set of construction project files stored within the at least one sub-directory to identify the status of a construction project task. If the at least one sub-directory is empty, then a barcode configured to access the at least one sub-directory may indicate to a user that a respective construction project task has not been completed/updated.

Figure 4:
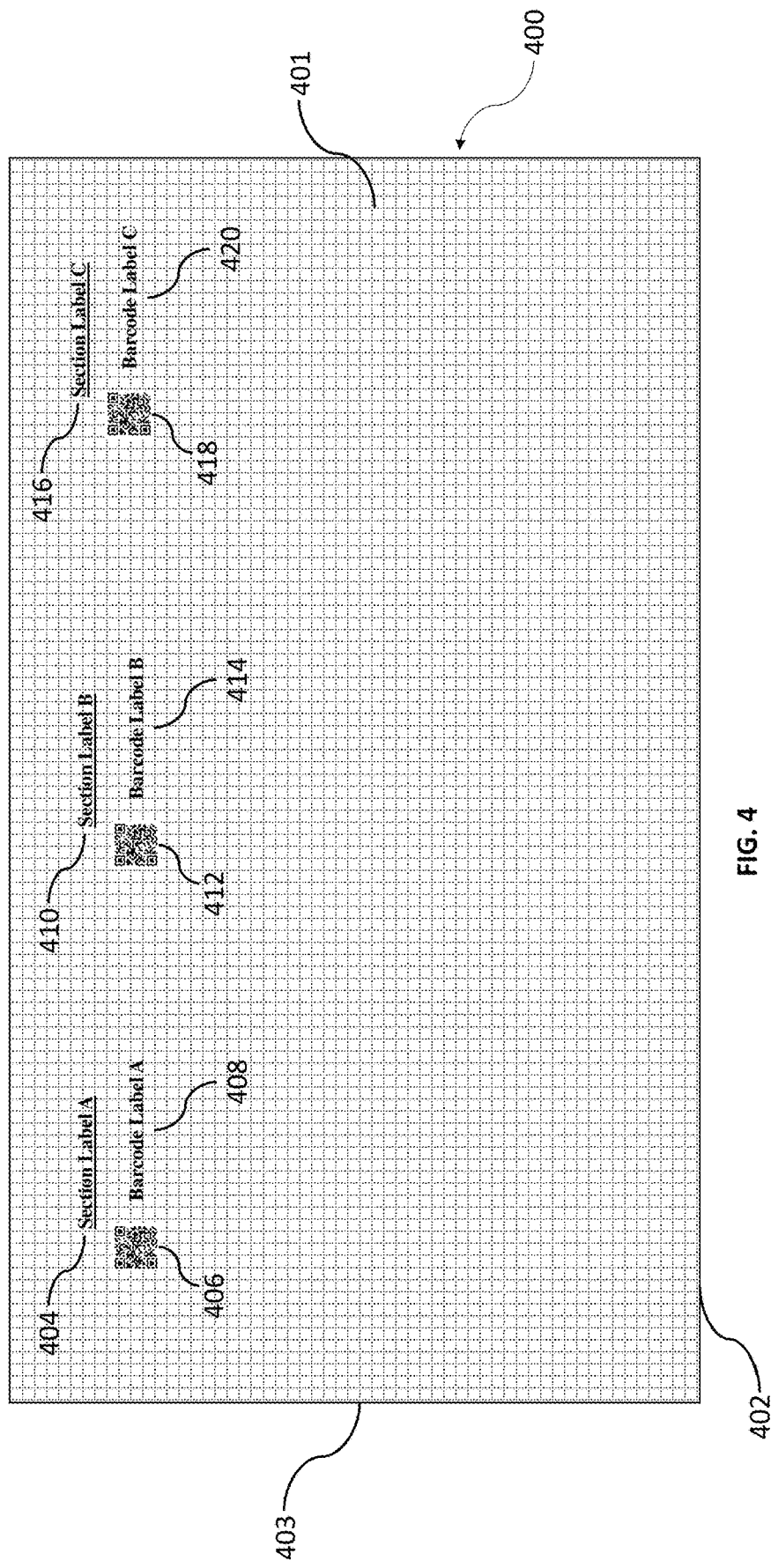
FIG. 4 shows an arranged plurality of barcodes according to embodiments.

Referring now to the drawings, FIG. 4 depicts one embodiment of a design interface for arranging a plurality of two-dimensional (2D) bar codes 400. In the present embodiment, the plurality of 2D barcodes 400 are arranged on an electronic canvas (i.e., interface) 401 that can be either prepopulated and/or created or modified by a user. Canvas 401 is a rectangular coordinate grid that includes an x-axis 402 and a y-axis 403, but may be of any desirable two-dimensional geometric configuration (e.g., circular, square, triangular, etc). Canvas 401 contains a first barcode 406, a second barcode 412 and a third barcode 418 (hereinafter, collectively the "Canvas Barcodes"). Each barcode of the Canvas Barcodes is further compartmentalized into a section, in this example three sections, with individual section labels that identify the category for each given section. It is understood, that any number of sections may be employed, and each section may include any number of 2D barcodes.

Each barcode of the Canvas Barcodes is identified with a unique barcode label, the unique barcode label identifies what service is accessible via a respective 2D barcode. First barcode 406 is a member of Section Label A 404 and the accessible service is identified by Barcode Label A 408. Second barcode 412 is a member of Section Label B 410 and the accessible service is identified by Barcode Label B 414. Third barcode 418 is a member of Section Label C 416 and the accessible service is identified by Barcode Label C 420.

For example, Section Label A 404 may identify barcodes that pertain to the category of construction project documentation. Barcode Label A 408 identifies the first barcode 406 as a general construction project information document in which the general construction project information document is a type of service, in this case data, in the category of construction documentation.

For example, Section Label B 410 may identify barcodes that pertain to the category of construction project communication. Barcode Label B 414 identifies the second barcode 412 as a request for information form in which the request for information form is a type of service in the category of construction project communication.

For example, Section Label C 416 may identify barcodes that pertain to the category of construction project safety. Barcode Label C 420 identifies the third barcode 418 as a safety videos portal in which the safety videos portal is a type of service in the category of construction project safety.

In the present embodiment, each section (i.e., Section Label A 404, Section Label B 410, and Section Label C 416) is comprised of one barcode (i.e., first barcode 406, second barcode 412, and third barcode 418). As noted, each section may include any number of barcodes. For example, Section Label A 404 may include three barcodes, Section Label B 410 may include two barcodes, and Section Label C 416 may include five barcodes. As a further alternative embodiment, the plurality of barcodes 400 may be arranged in any number of sections. For example, one embodiment of an arranged plurality of barcodes may comprise five distinct sections that each represent a distinct category of a construction project.

In the present embodiment, Canvas Barcodes are arranged in a straight line parallel to x-axis 402. Alternatively, each barcode of a plurality of barcodes may be positioned at any point within canvas 401. For example, canvas 401 may include a first 2D barcode in the lower left corner and a second 2D barcode in the upper right corner of canvas 401. As a further alternative embodiment, the coordinate position of each barcode may be determined from a canvas template created by a design professional through the web application interface. The design professional may specify which barcode categories, or accessible features, are located at specific position on the canvas template. For example, a design professional positions three 2D barcodes along the top of canvas 401 (e.g., extending from the top left corner to the top right corner) and positions three barcodes along the bottom of canvas 401 (e.g., extending from the bottom left corner to the bottom right corner).

Figure 10:
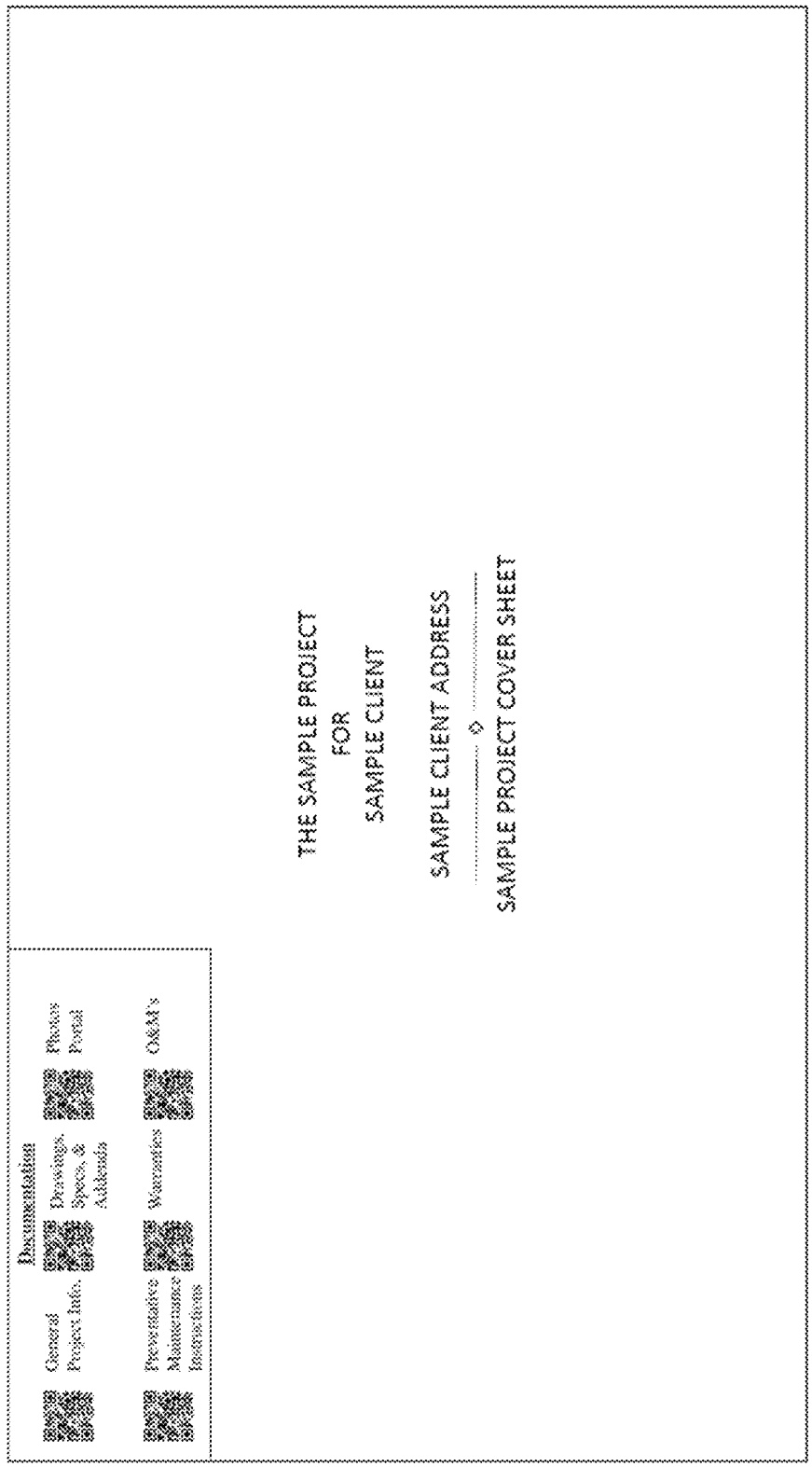
FIG. 10 shows an arranged plurality of barcodes according to embodiments.

FIG. 10 is a depiction of one embodiment of an arranged plurality of 2D bar codes on a cover sheet as described in FIG. 4. In this embodiment, QR codes are arranged in a grid located in the top left of the cover sheet.

Figure 11:
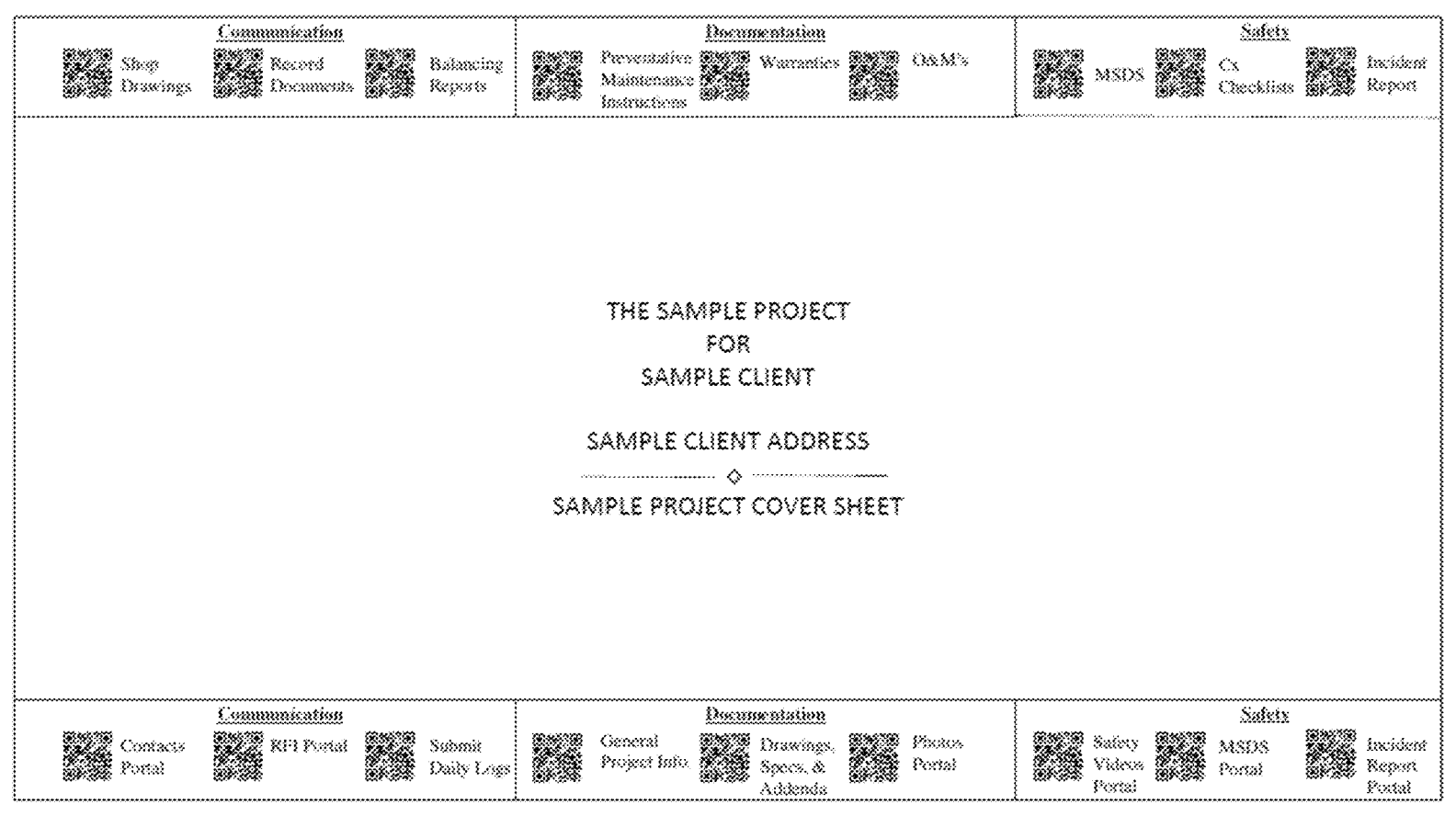

FIG. 11 is a depiction of one embodiment of an arranged plurality of 2D bar codes on a cover sheet as described in FIG. 4. In this embodiment, QR codes are located along the top and bottom margins.

Figure 12:
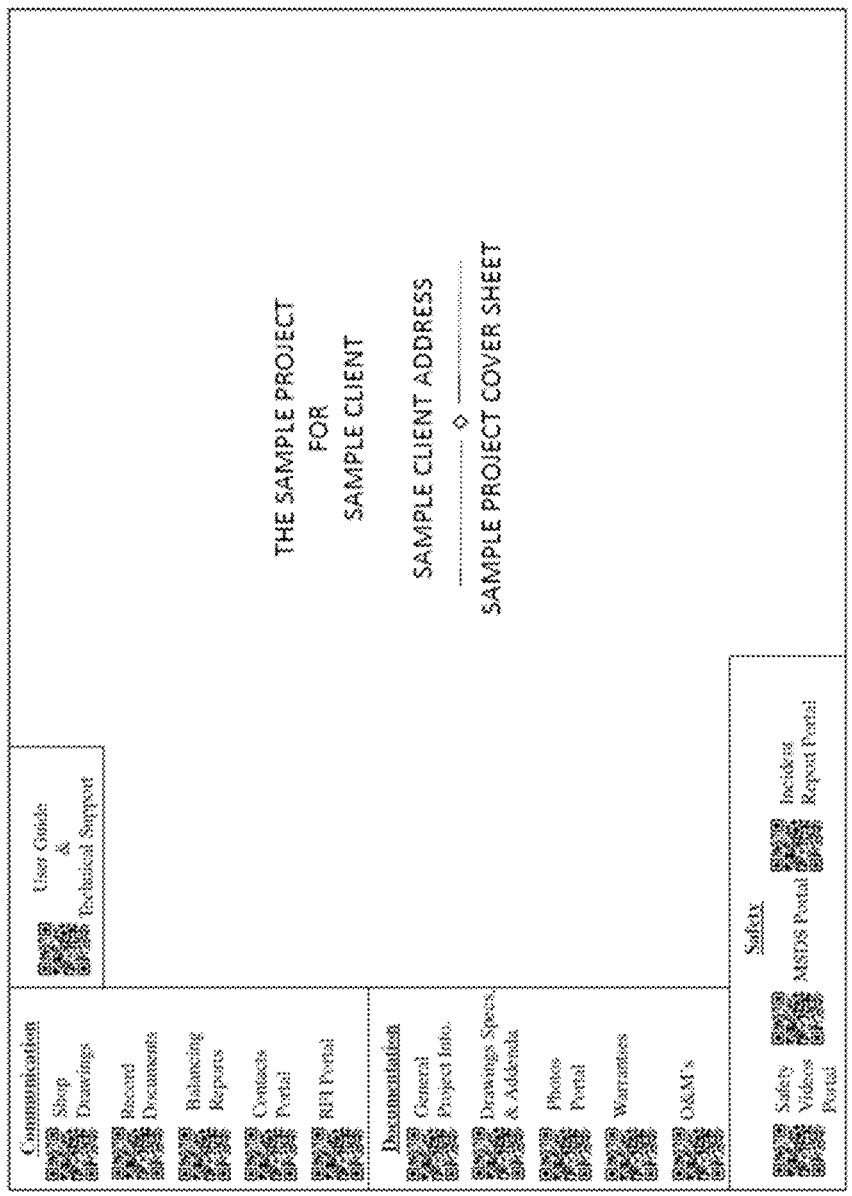
FIG. 12 shows an arranged plurality of barcodes according to embodiments.

FIG. 12 is a depiction of one embodiment of an arranged plurality of 2D bar codes on a cover sheet as described in FIG. 4. In this embodiment, QR codes are located along the left margin.

Figure 13:
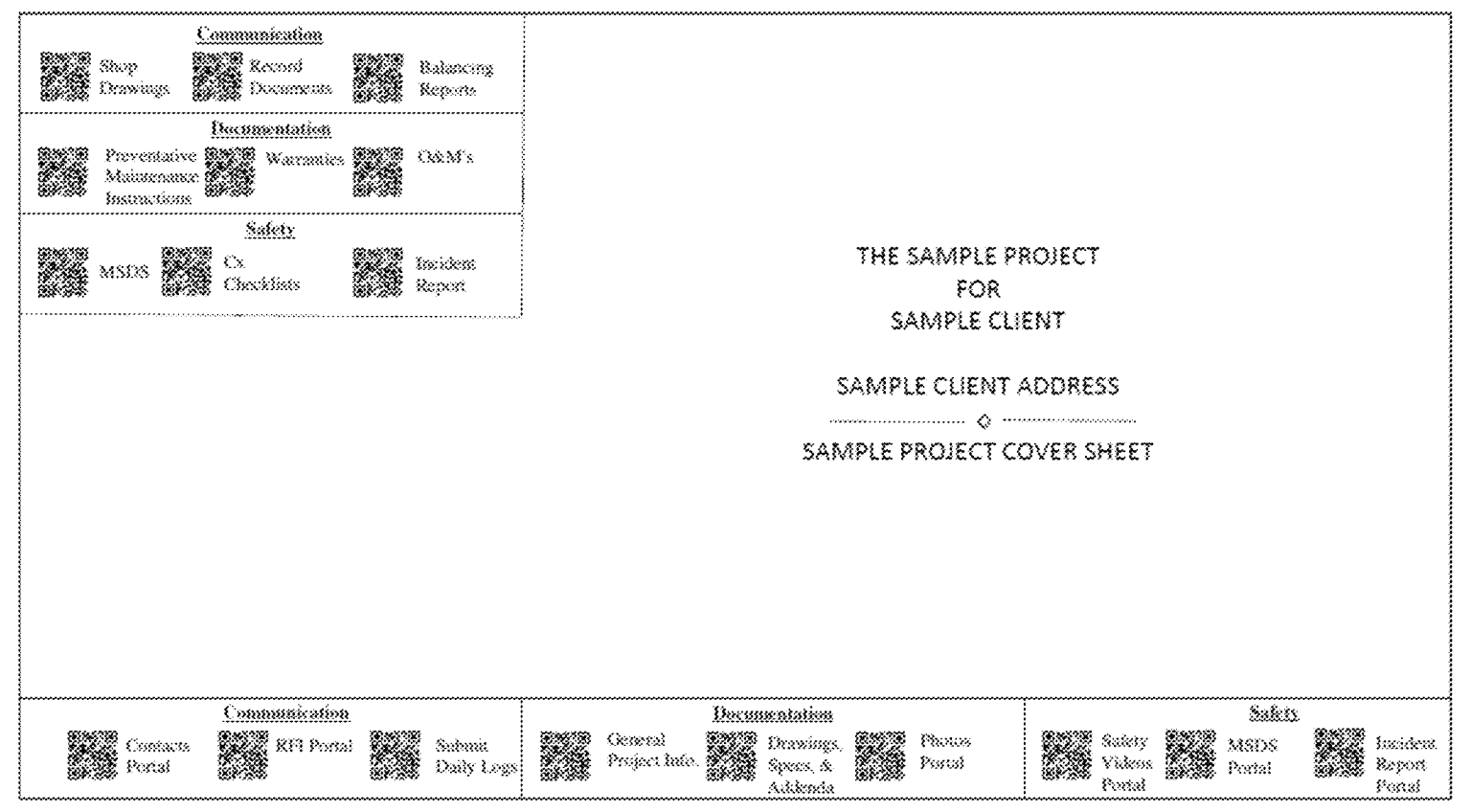

FIG. 13 is a depiction of one embodiment of an arranged plurality of 2D bar codes on a cover sheet as described in FIG. 4. In this embodiment, QR codes are located along the top left corner and bottom margin.

While the examples provided herein describe generating bar codes (such as QR codes) on a coversheet, it is understood that bar codes can be generated on any number of sheets, including multiple coversheets. For example, each "discipline" (e.g., Architectural, Mechanical, Electrical, Civil, etc.) could potentially have their own cover sheet within the set of design drawings. As such, the process may store a unique QR Arrangement for each discipline.

Figure 5:
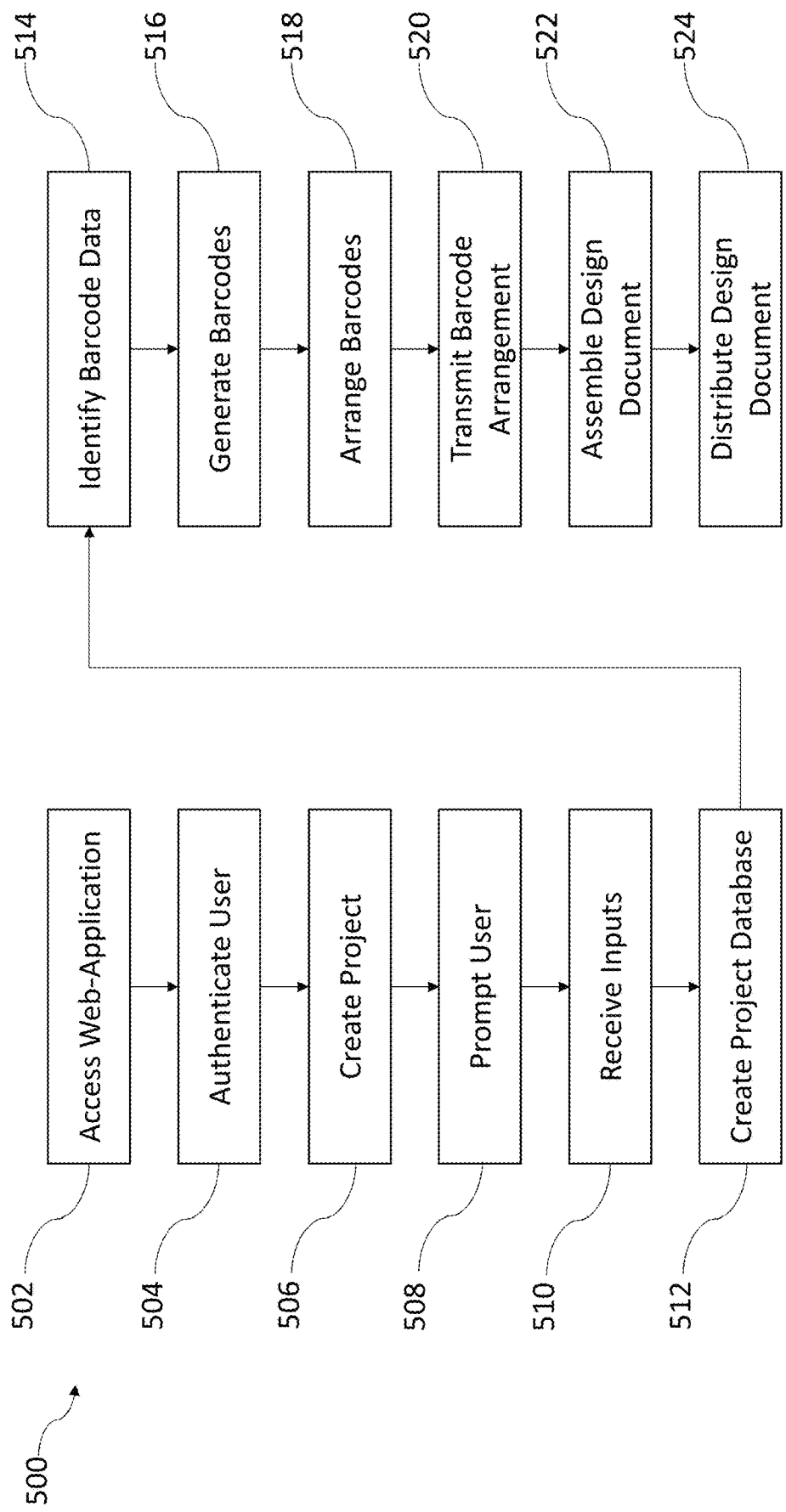
FIG. 5 shows a flow diagram of a method to create an arranged plurality of barcodes according to embodiments.

FIG. 5 is a depiction of a flow diagram of one embodiment of a pre-construction method 500 to create a digital file that includes an arrangement of barcodes associated with a construction project. In the present embodiment, a user accesses a web application 502 that includes at least one authentication method 504 to verify user credentials. If an authenticated user elects to create a new project 506, the web application 502 asks the authenticated user a plurality of prompts 508 to obtain information pertaining to new project 506. The authenticated user provides a plurality of inputs 510 in response to the plurality of prompts 508. Web application 502 uses plurality of inputs 510 to generate a project database 512. Plurality of inputs 510 may include a construction file, or a set of construction files, associated with a construction project that are stored in project database 512. Project database 512 may include partitions based on one or more categories of construction files for a respective construction project. Web application 502 may identify barcode data 514 based on plurality of inputs 510 stored in created project database 512. Identifying barcode data 514 may include selecting a plurality of unique web resources that project database 512, or a specified partition of project database 512, may be accessible through. Web application 502 generates a plurality of barcodes 516 based, at least in part, on identified barcode data 514. Plurality of barcodes 516 may be stored on projected database 512. Web application 502 may generate an arrangement of barcodes 518 based, at least in part, on the plurality of barcodes 516. Arrangement of barcodes 518 may be stored in project database 512. Web application 502 may execute a transmission method 520 configured to transmit barcodes 518 to at least a first user. Arrangement of barcodes 518 may affix to design documents 522 and distributed 524 to relevant parties associated with the construction project.

Figure 6:
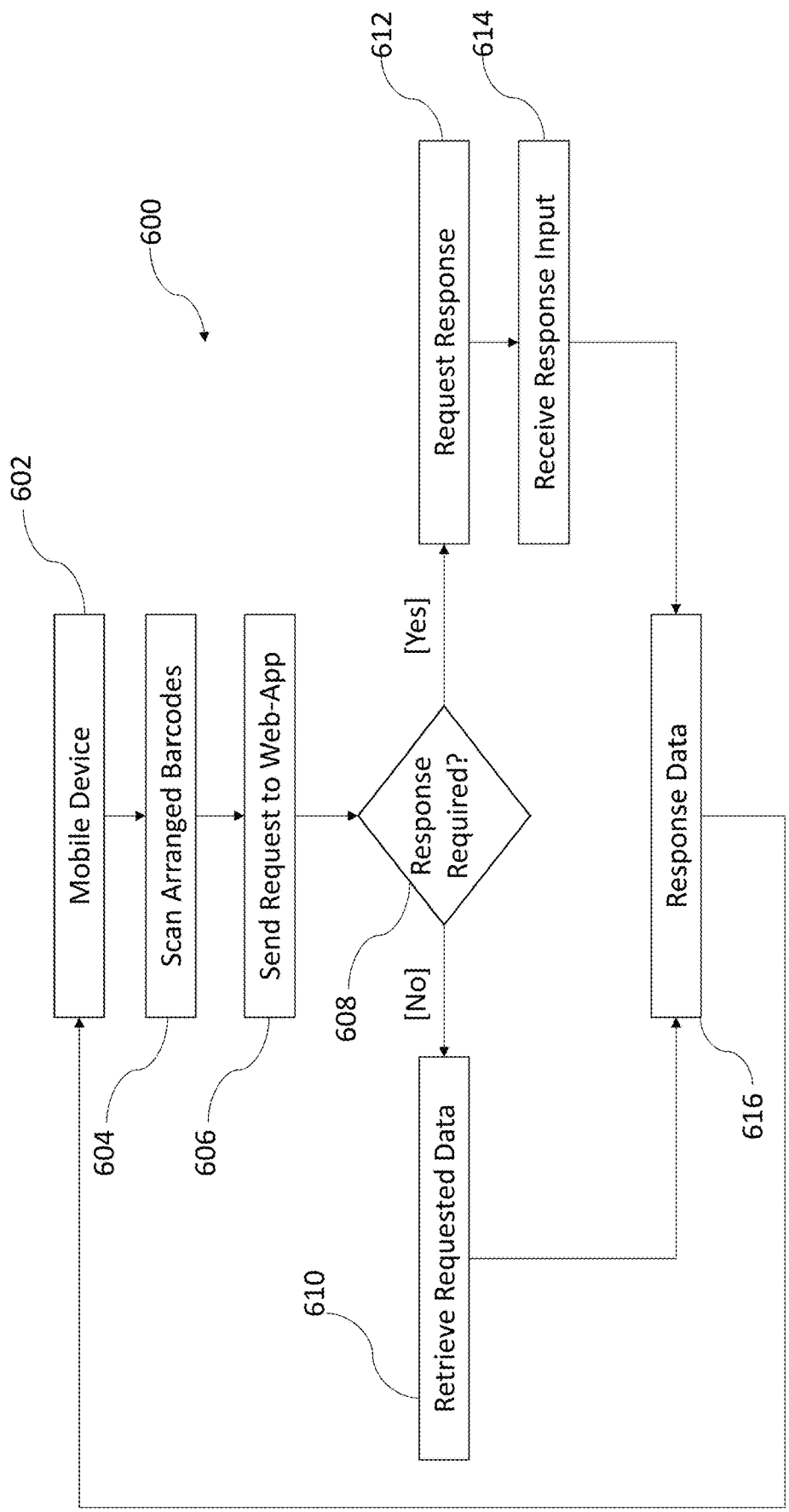
FIG. 6 shows a flow diagram of a method to access and utilize an arranged plurality of barcodes according to embodiments.

FIG. 6 depicts a flow diagram of one embodiment of a barcode data access method 600, during which a construction personnel or the like are viewing design documents. In the present embodiment, a mobile device 602—equipped with the ability to recognize, read and process scannable technology—scans one of an arranged plurality of barcodes 604 on a document. Mobile device 602 scans a unique barcode, of the arranged plurality of barcodes, to send a web application request 606 to execute a remote data processing system to access a feature or service available through a web application. Web application request 606 may be based on a unique web resource encoded within a respective unique barcode, and determines whether a third party user response is required in step 608. If a third party user response is not required, the method proceeds to retrieves requested data 610 from a database associated with the arranged barcodes. Retrieved request data 610 subsequently returns response data 616 to the mobile device 602. If the service involves an interactive process (e.g., a request is required in step 608), then the web application initiates a request response 612 asking for input from a third party (not shown) that is identified in web application request 606. The web application waits until it receives a response input 614 from a third party. Received response input 614 may be processed and structured as response data 616 prior to transmitting said data to mobile device 602. It is understood that the service associated with each QR code may involve any type of automated, computer based service, e.g., executing a program, launching a web site, running a web app, sending a text, making a call, etc.

Figure 7:
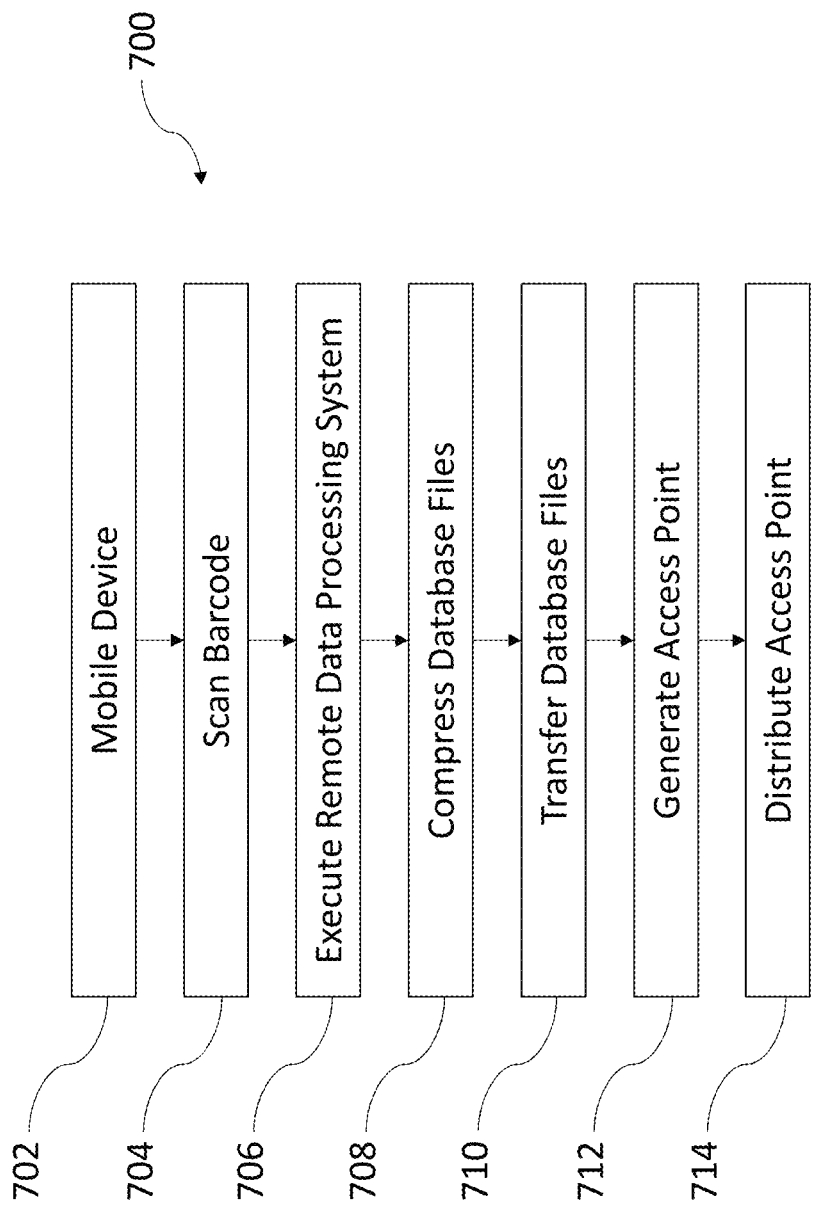
FIG. 7 shows a flow diagram of a method to access and utilize an arranged plurality of barcodes according to embodiments.

Turning now to FIG. 7 depicting an embodiment of a data compression process 700. In the present embodiment, a mobile device 702 scans a barcode 704 to execute a remote data processing system 706. Remote data processing system 706 may include accessing a web application to execute a function configured to compress a plurality of database files 708. Compressed database files 708 may include files, documents, or other data associated with one or more construction projects. Data compression process 700 may proceed to transfer database files 710 yielded in compress database files 708 to a computer readable storage medium such as, for example, a cloud computing database. Data compression process 700 generates an access point 712 which includes creating a unique web resource to enable a user to retrieve database files transferred to the computer readable storage medium location yielded in 710. Generate access point 712 may include encoding a unique web resource to generate one or more two-dimensional barcodes configured to access the unique web resource via scanning with the sensor of a computing device. Data compression process 700 proceeds to distribute the access point 714 to one or more users associated with a construction project. Distributing access point 714 may include transmitting a unique web resource as plain text or as a two-dimensional barcode. For example, a construction project manager scans a QR code after a construction project has completed to execute a function that compresses all project files for the project. Compressed files are stored on a cloud storage server and a URL to access the compressed files is sent to the construction project manager and other personnel.

Figure 8:
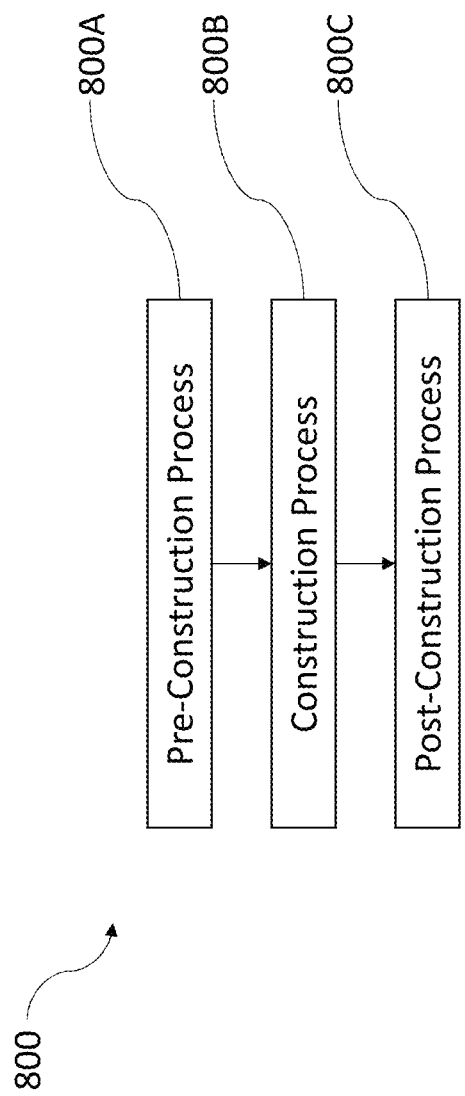
FIG. 8 shows a flow diagram of a three phase method according to embodiments.

Turning now to FIG. 8, a depiction of one embodiment of a three phase process 800 is shown. The three phase process 800 is comprised of pre-construction process 800A, construction process 800B, and post-construction process 800C. Each phase of the three phase method 800 are described in detail with accompanying figures below.

Figure 8A:
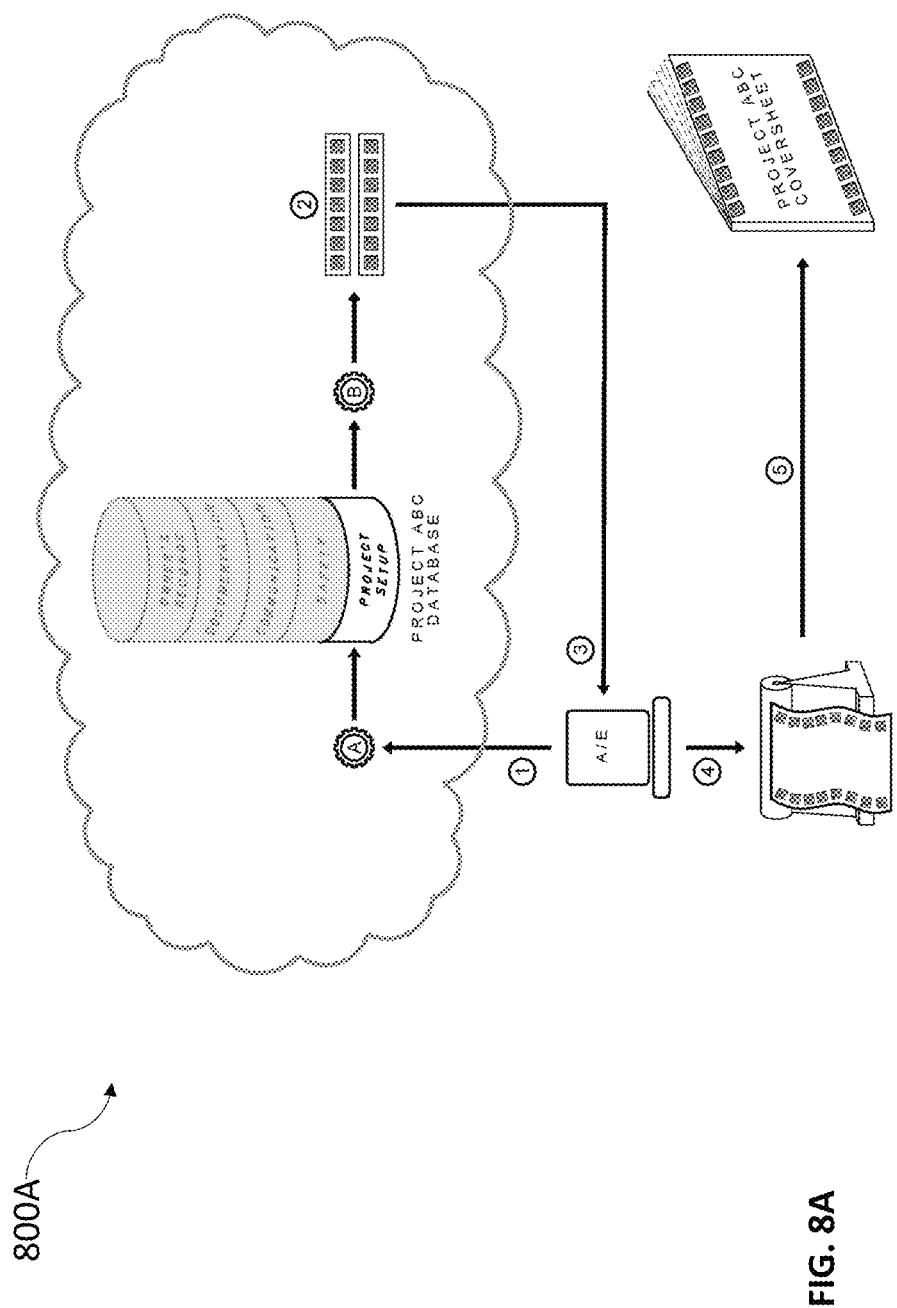
FIG. 8A shows a flow diagram of a first phase method according to embodiments.

Turning now to FIG. 8A, a depiction of one embodiment of a pre-construction process 800A is shown. In the present embodiment, a design professional (e.g., architect, engineer, or similar) initiates the pre-construction process 800A by logging into a secure, web-based server and electing to establish a new project. As part of this project setup procedure, the design professional is prompted by the web-based application to respond to a series of questions, forms, etc. The respective, project-specific input is stored and processed by the web-based application as further detailed below in Process "A" and Process "B" Narrative.

Process "A" of the web-based application collects the inputted data from the design professional and establishes a new project ("Project ABC") within the design professional's registered account. A secure, project-specific database, dedicated to this new Project ABC, is created and populated with the data collected from the design professional.

Process "B" of the web-based application compiles certain information from the database and implements an algorithm which generates a unique QR Code, or other similar scannable pattern, for each of the "topics" that the design professional has elected to convey directly from the design drawings. The Process "B" algorithm then positions the newly generated scannable codes into a standard arrangement, or an arrangement specifically requested by the design professional. The scannable code arrangement may be stored as an individual file(s) to be added to a document later and/or positioned on a specified canvas to be accessed, transmitted, and/or used.

The scannable code arrangement may be configured as a linear "strip(s)" (as shown on the diagrams), a vertical column(s), an array(s), a matrix(s), or any other possible geometric arrangement of multiple scannable codes. The scannable arrangement of codes are saved within the project-specific database in digital format, awaiting transmission to the design professional.

The systems and methods of file transmission may include, but not be limited to: Download; FTP; E-mail; In-Mail; etc. Once received, the design professional will attach the arrangement of scannable codes to their design documents. The systems and methods of attachment to the design drawings shall include, but not be limited to: (i) Digital insertion via third-party CAD/CAM software; (ii) digital insertion via third-party photo-manipulation software; (iii) printing, cutting and pasting, sticking, etc.; or (iv) any other means available.

Upon inclusion of the scannable code arrangement onto the design documents, the design professional publishes and reproduces the complete design document set(s).

The complete design document set is distributed, as required, entering into the construction phase of the specific project.

Figure 8B:
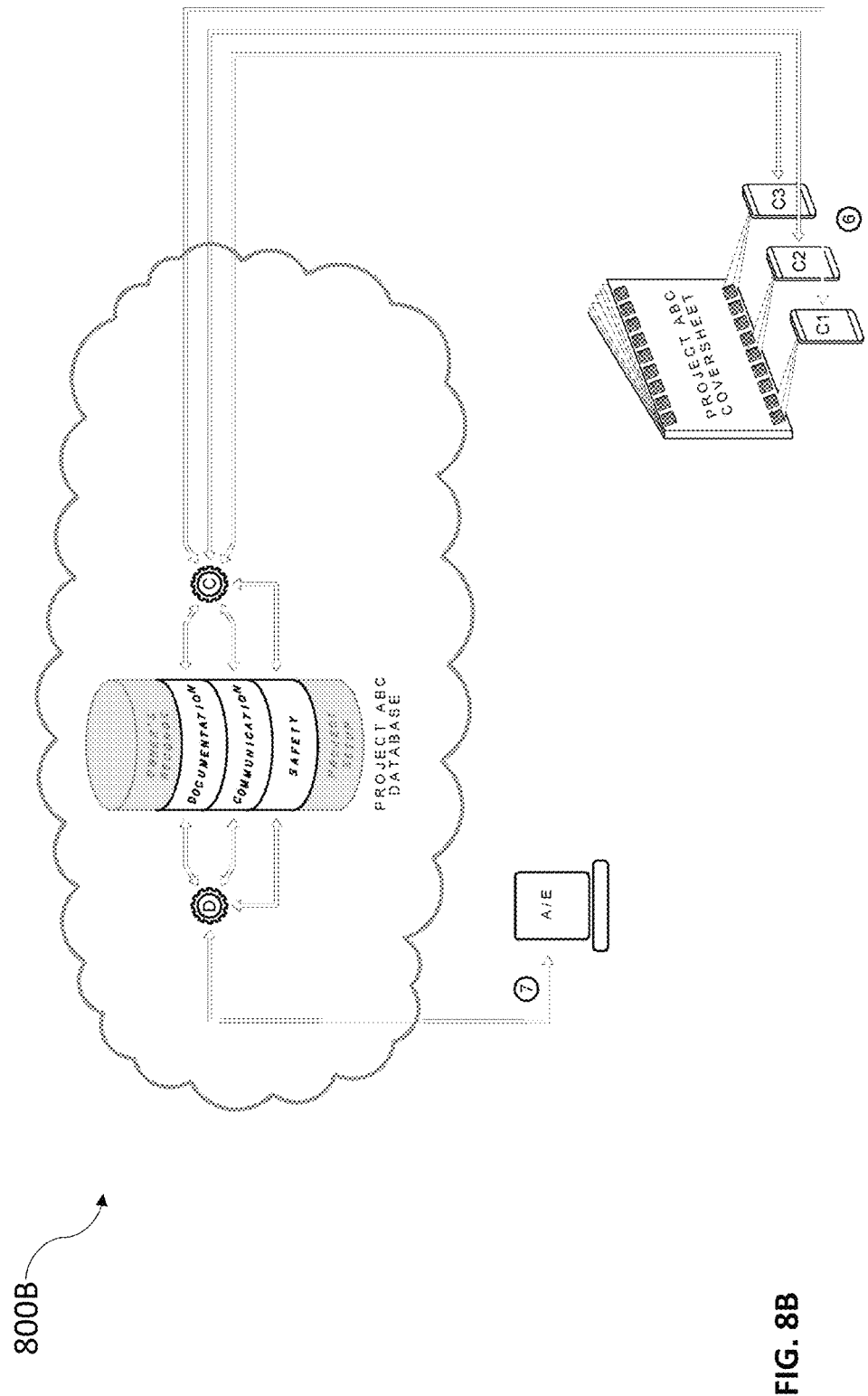
FIG. 8B shows a flow diagram of a second phase method according to embodiments.

Turning now to FIG. 8B, a depiction of a diagram of one embodiment of construction process 800B is shown. In the present embodiment, the design documents have been distributed by the design professional and are now in the possession of one or more of the following parties, including: (a) construction personnel, (b) equipment vendors, (c) manufacturers, (d) facility managers, and (e) commissioning agents, etc. The presence of the scannable code arrangement(s) on the design documents provides all parties involved with one or more of the following features, including: (i) direct contact to the design professional; (ii) a centralized system streamlining project communication; (iii) a mechanism for submitting and/or gathering project-specific documentation; (iv) providing real-time safety-related information; and (v) providing real-time guidance, etc.

In the present embodiment, the scannable code arrangement(s) on the design documents are used to access the project-specific database. The project-specific database is compartmentalized into, e.g., three database categories accessible through the scannable code arrangement(s) during the construction process 800B, the three database categories comprising documentation, communication, and safety. It follows that the scannable code arrangement(s) are analogously compartmentalized, the three scannable code categories comprising documentation codes, communication codes, and safety codes.

Alternatively, an embodiment of the claimed invention may include other code categories such as scheduling, payment applications, change orders, cost management, project directory, inspections, time tracking, equipment tracking, punch lists, tasks, field observations, meeting minutes, photos, and bidding. Each code category may be designated to a "code category region" that indicates at least a portion of surface area of a canvas/design document to populate with one or more barcodes that are within a respective code category. For example, a scheduling category and a change orders category each contain one two-dimensional barcode positioned in the left and right corner of a canvas template, respectively.

Documentation codes enable a user with a mobile device equipped with the ability to recognize, read and process scannable technology to remotely upload and download real-time, project-specific documentation. Documentation codes may include sub-categories of barcodes such as, for example, (1) general requirement submittals; (2) shop drawing submittals; (3) testing, adjusting, and balancing reports; (4) sustainability reports; (5) commissioning reports; (6) design drawings and specifications; (7) addenda; and (8) as-built drawings. Examples of documentation codes may include, inter alia, one or more of the following: (a) Permits, (b) Payment Applications, (c) Bond Forms, (d) Certificates of Insurance, (e) Construction Meeting Minutes, (f) Equipment Shop Drawings, (g) Equipment Start-Up Reports, (h) Equipment Warrantees, (i) Equipment Operation and Maintenance Data, (j) Equipment Start-Up and Adjusting Reports, (k) Training Reports, and (l) Balancing Reports, etc.

Communication codes enable a user with a mobile device equipped with the ability to recognize, read and process scannable technology to remotely initiate project-related, one-way and two-way communication. Such communication may include, but not be limited to, one or more of the following: (a) Requests for Information, (b) Requests for Proposals, (c) Payment Applications, and (d) Access to Construction Directives, etc.

Safety codes enable a user with a mobile device equipped with the ability to recognize, read and process scannable technology to remotely upload and download real-time, project-specific safety-related content and documentation. Such content and documentation may include, but not be limited to, one or more of the following: (a) Material Safety Data Sheets, (b) Daily Logs, (c) Incident Reports, (d) OSHA Safety Videos, (e) OSHA Injury Reports, (f) Site-Specific Safety Standards, and (g) Third-Party Safety Equipment Procurement, (h) state and federal labor laws, etc.

Process "C" of the web-based application receives a request from a remote mobile device that scanned a particular code on the design documents. An algorithm within Process "C" interprets the request and, based on either the pre-programming established by the design professional during project setup, or pre-programming established by the web-based application, directs the appropriate content, data, communication process, etc., to the user's mobile device.

Process "D" of the web-based application, when called upon, is utilized to carry out two-way communication between the remote user in the field and the design professional. An algorithm within Process "D" is enabled when Process "C" requires a response from the design professional.

When required, as determined by the algorithm within Process "D", the design professional will be required to provide input, or a response satisfying the request initiated by the remote user.

Figure 8C:
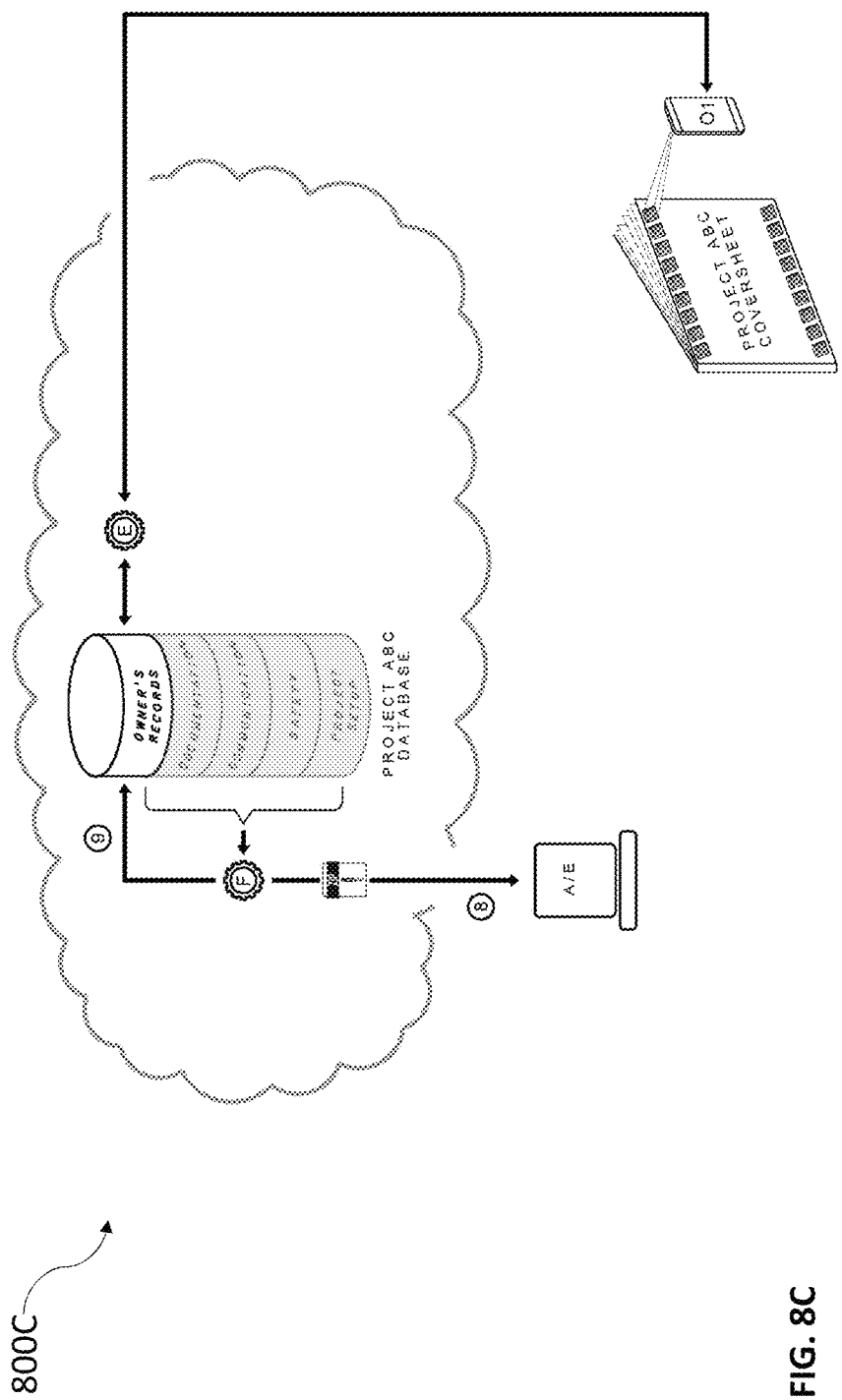
FIG. 8C shows a flow diagram of a third phase method according to embodiments.

Turning now to FIG. 8C, a depiction of one embodiment of a diagram of the post-construction process 800C is shown. In the present embodiment, the scannable code arrangement(s) on the design documents are further comprised of at least one facility code.

Facility codes enable a user with a mobile device equipped with the ability to recognize, read and process scannable technology to access project-specific content, documentation, etc. Such content, documentation, etc. may include, but not be limited to, one or more of the following project-specific, design-professional-approved documents: (a) Equipment Shop Drawings, (b) Equipment Start-Up Reports, (c) Equipment Warrantees, (d) Equipment Operation and Maintenance Data, (e) Equipment Start-Up Reports, (f) Training Videos and Reports, (g) Balancing Reports, (h) As-Built Documentation, (i) Material Safety Data Sheets, etc. The facility codes feature provides a project Owner with a readily available means to digitize and access project-specific information indefinitely. All digitized content, documentation, etc. will be available to the project Owner, and personnel, until the web-based application subscription is terminated by the project Owner.

Process "E" of the web-based application receives a request from a remote mobile device that scanned a particular code on the design documents. An algorithm within Process "E" interprets the request, retrieves the respective content from the project database and directs it to the user's mobile device.

Process "F" of the web-based application receives a directive from the design professional to close the project, indicating that the construction process 800B of the project has been completed and, e.g., the project's physical site has been turned back over to the Owner. Upon receiving this directive, an algorithm within Process "F" gathers selective digital data stored within the Documentation, Communication, Safety, Project Setup, etc., partitions within the project database. This digital information is compiled and prepared for distribution and/or reallocation as described below.

Upon issuing the directive to close the project, the design professional and/or other project team members will be provided the opportunity to access an archived, compressed ("zip", or similar) folder containing all project-related files, content, documentation, communication, etc. In addition, the web-based application will retain the archived, compressed ("zip", or similar) folder in a separate, secure database. This archived folder will remain available to the design professional until the web-based application subscription is terminated by either the design professional, or the project owner.

The algorithm associated with Process "F" will transfer certain project-specific content, documentation, etc., from the respective project database partitions to a separate partition dedicated to providing the Owner of the project with unrestricted access to such content and documentation, as required and requested by the algorithm associated with Process "E".

Figure 9:
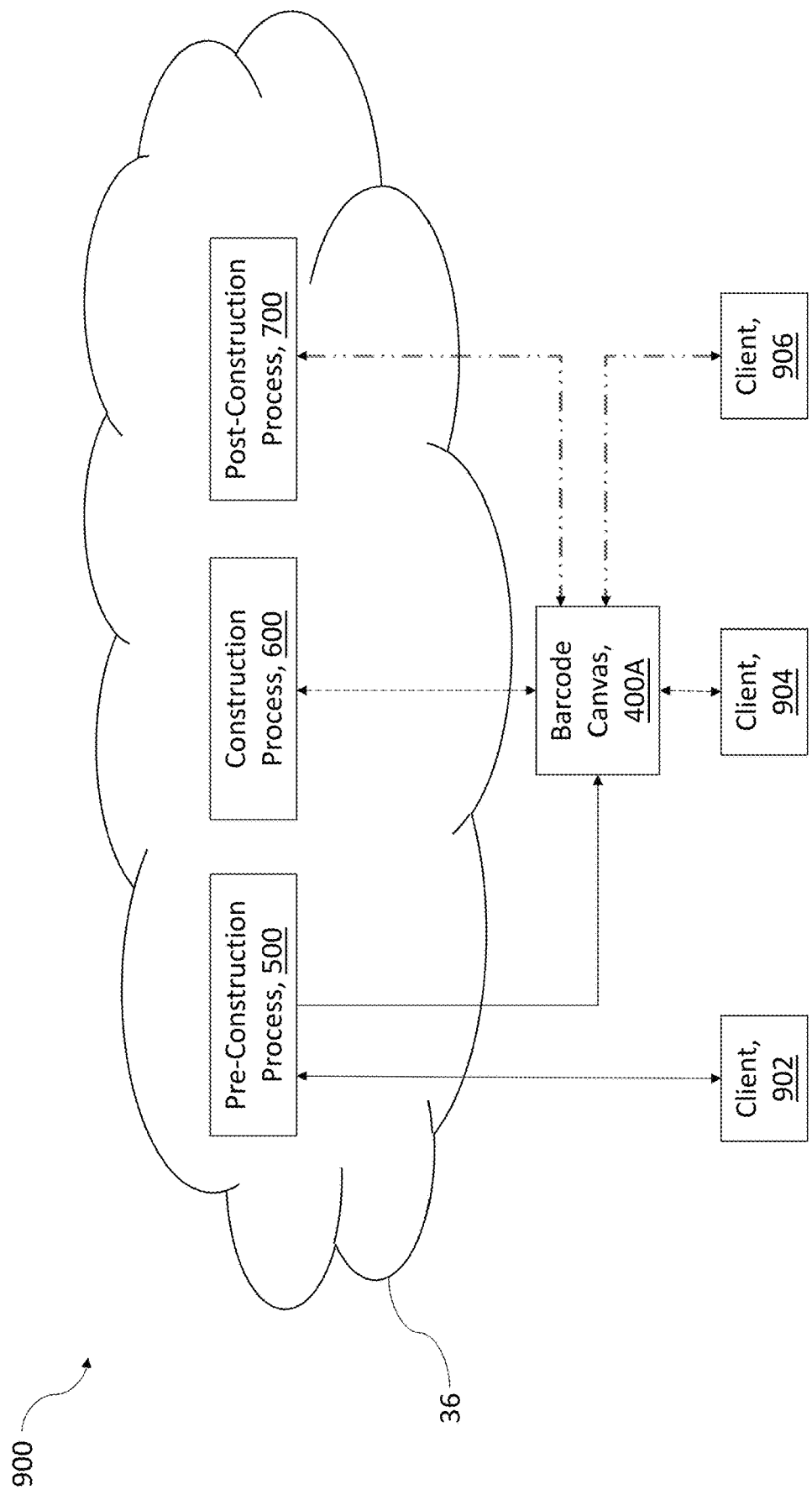
FIG. 9 shows a flow diagram of three methods according to embodiments.

FIG. 9 depicts an embodiment of the present invention including a system and method of generating an arranged plurality of 2D barcodes to be used in a construction project. In the present embodiment, a network 36 such as that shown in FIG. 1 is configured to include a pre-construction process 500 such as that shown in FIGS. 5 and 8A, a construction process 600 such as that shown in FIGS. 6 and 8B, and a post-construction process 700 such s that shown in FIGS. 7 and 8C. A first client 902 of FIG. 9 initiates the pre-construction process 500. The first client 902 is accessed by a design professional tasked with generating a plurality of arranged barcodes according to the pre-construction process 500 outlined in FIGS. 5 and 8A. The pre-construction process 500 generates an arranged barcode canvas 400A, wherein the arranged barcode canvas 400A is comprised of a plurality of QR barcodes on a project cover sheet as, e.g., outlined in FIG. 4A. The arranged barcode canvas 400A is accessed via a second client 904 as shown in FIG. 9. The second client 904 provides a system by which an end user (e.g., a person on a job site) scans a QR barcode, of the plurality of QR barcodes on the arranged barcode canvas 400A, to initiate construction process 600 outlined, e.g., in FIGS. 6 and 8B. The second client 904 allows the user, or additional authorized third-parties (not shown), to continue to access one or more QR barcodes on the arranged barcode canvas 400A during the life of the construction project. The specific function to be carried out by construction process 600 is based, at least in part, on data contained within a given QR barcode and the underlying method associated with a given QR barcode. Subsequently, a third client 906 of FIG. 9 provides a system that allows a user to scan a QR barcode, of the plurality of QR barcodes on the arranged barcode canvas 400A, to initiate post-construction process 700 outlined in FIGS. 7 and 8C.

Figure 14:
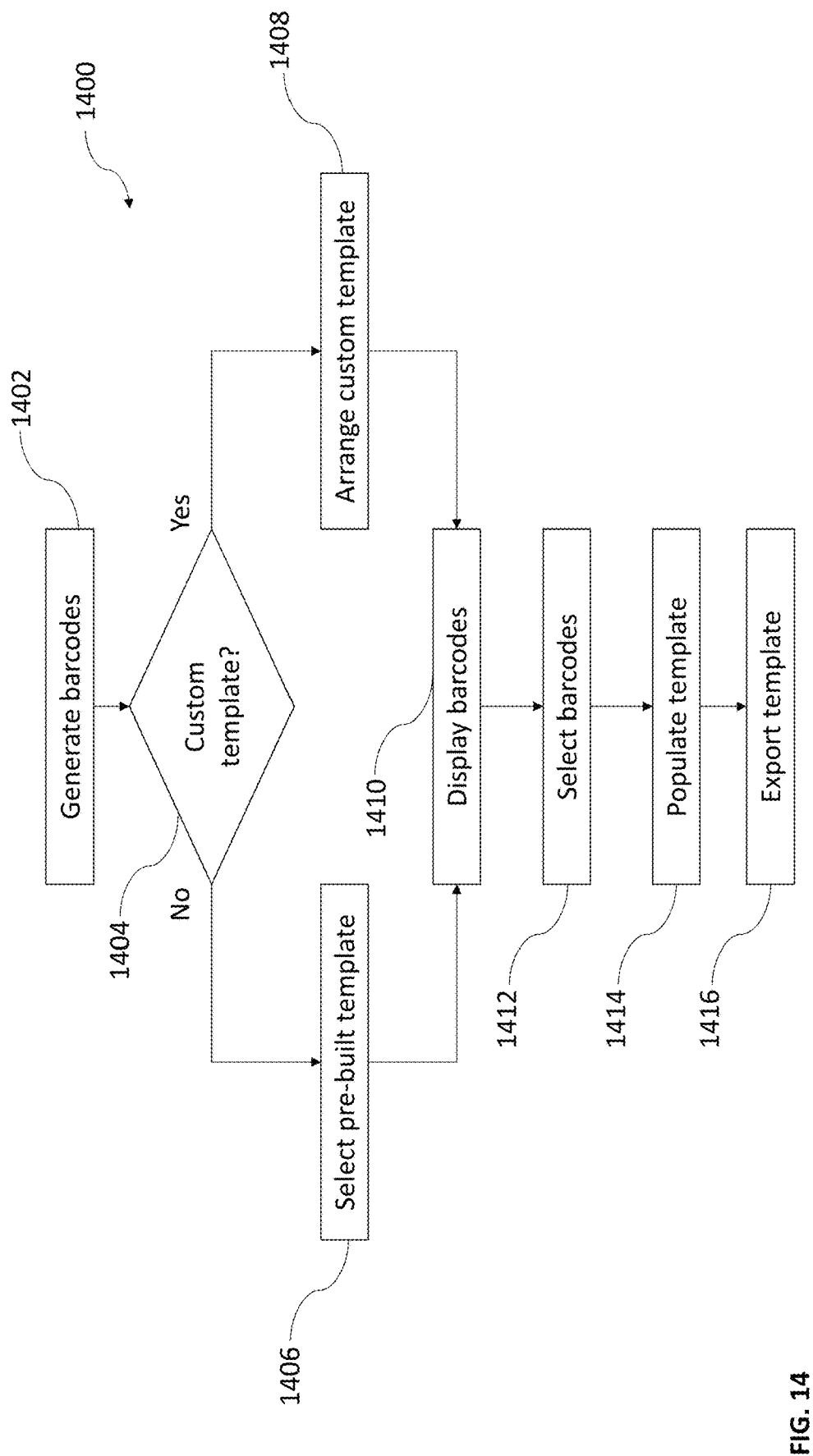
FIG. 14 shows a flow diagram of a method to create an arranged plurality of barcodes according to embodiments.

FIG. 14 depicts a flow diagram of one embodiment of a method 1400 to create an arrangement (i.e., layout) of two-dimensional (2D) barcodes for a construction project. In the present embodiment, generate barcodes of step 1402 may include processing user input to yield a plurality of 2D barcodes (e.g., QR codes) according to embodiments of the claimed invention. Step 1402 may include engaging a graphical user interface (GUI) of a web application to upload one or more construction project files, documents, data, etc., to a construction project database. Step 1402 may include creating or accessing a metadata profile for each 2D barcode that includes, for example, one or more of the following: a unique web resource, a unique identifier, a barcode category, and a barcode label. Step 1402 may include querying a project database to retrieve barcode metadata. Step 1402 may include storing barcode metadata in a project database. Step 1402 may include encoding a unique web resource in a 2D barcode format which, in response to be scanned with a computing device, directs the computing device to a web application to perform a construction project task such as, inter alia, access a construction project file or trigger a function of the web application.

Method 1400 proceeds to prompt a user of a web application to decide whether to use a custom template at step 1404 to arrange the plurality of 2D barcodes yielded in step 1402. Step 1404 may include engaging a form, dialogue box, or other mechanism to receive user input through a GUI of a web application. Step 1404 may include processing a response using computer programming logic (e.g., True/False, Yes/No) to determine what information to subsequently display on a GUI. The term "template" of method 1400 may be considered to a "canvas" as used to describe other embodiments. It follows that a "pre-built template" is a "pre-built canvas" to populate/arrange barcodes according to embodiments of the claimed invention.

If the response yielded in Step 1404 is "No," then method 1400 proceeds to prompt a user to select a pre-built template of step 1406. Step 1406 may include displaying one or more pre-built templates that a user may implement to display one or more of the 2D barcodes yielded in step 1402. Step 1406 may include engaging a form, dialogue box, or other mechanism to receive user input through a GUI of a web application. Step 1406 may include, for example, prompting a user to choose a pre-built template selected from the group consisting of an array/strip of barcodes or a matrix/grid of barcodes. Step 1406 may include specifying a quantity of rows and columns in a grid of barcodes. Step 1406 may include specifying one or more code category regions in a canvas template to populate with barcode(s) associated with a respective code category.

If the response yielded in step 1404 is "Yes," then method 1400 proceeds to prompt a user to arrange a custom template of step 1408. Step 1408 may include receiving user input through the GUI of a web application. Step 1408 may include "drag-and-drop" functionality that enables a user to manipulate the location and orientation of a barcode on a canvas displayed on the GUI of a web application. Step 1408 may include specifying the geometric configuration of a template. Step 1408 may include specifying one or more code category regions in a canvas template to populate with barcode(s) associated with a respective code category. Step 1408 may include specifying one or more code category regions selected from the group consisting of a communication region, a documentation region, a safety region, a scheduling region, a payment applications region, and a change orders region. Step 1408 may include displaying a format toolbar configured to modify visual properties of a template such as, inter alia, font, font size, foreground/background colors, etc.

Method 1400 proceeds to display barcodes in step 1410 on the GUI of a web application. Step 1410 may include displaying a plurality of 2D barcodes and/or barcode labels of the plurality of 2D barcodes yielded in step 1402. Step 1410 may include querying a project database table to retrieve a plurality of barcode labels associated with a plurality of 2D barcodes yielded by step 1402. Step 1410 may include displaying a plurality of barcode labels and/or 2D barcodes as a list on the GUI of a web application. Step 1410 may include displaying one or more interface widgets (e.g., checkbox, dropdown menu, etc.) proximate to a barcode label and/or 2D barcode to enable a user to select one or more of the plurality of barcode labels and/or 2D barcodes through the GUI of the web application. Method 1400 proceeds to prompt a user to select one or more barcodes in step 1412 through the GUI display yielded in step 1410. Step 1412 may include engaging one or more interface widgets of the GUI to select at least one of the plurality of 2D barcodes yielded in step 1402.

Method 1400 proceeds to populate the template in step 1412. Step 1412 may include positioning at least one 2D barcode yielded in step 1412 on a template yielded in either step 1406 or 1408. Step 1412 may include processing metadata of each 2D barcode yielded in step 1412 to identify which code category region on a template to populate with each 2D barcode, respectively. Step 1412 may include determining the size of each 2D barcode relative to the template based on quantity of barcodes selected, dimensions of the template, or factors otherwise specified by the user.

Method 1400 proceeds to export the template (i.e., a layout) in step 1416. Step 1416 may include displaying a review/confirmation page on the GUI of a web application in which a user inspects a populated template yielded in step 1414. Step 1416 may include transmitting a populated template yielded in step 1414 to the user, a design professional, construction personnel, or other third party associated with a construction project. Step 1416 may include transmitting a populated template yielded in step 1414 in a digital file format selected from the group consisting of .SVG, .DWG, .DWF, .PDF, .JPG, .DWT, .RVT, .RFA, .RTE, .RFT, .DOC, .DOCX, .XLS, .XLSX, .TIF, .PNG, .BMP, and .GIF. Step 1416 may include affixing the populated template yielded in step 1414 to a second document such as, for example, a design document for a construction project.

Figure 15:
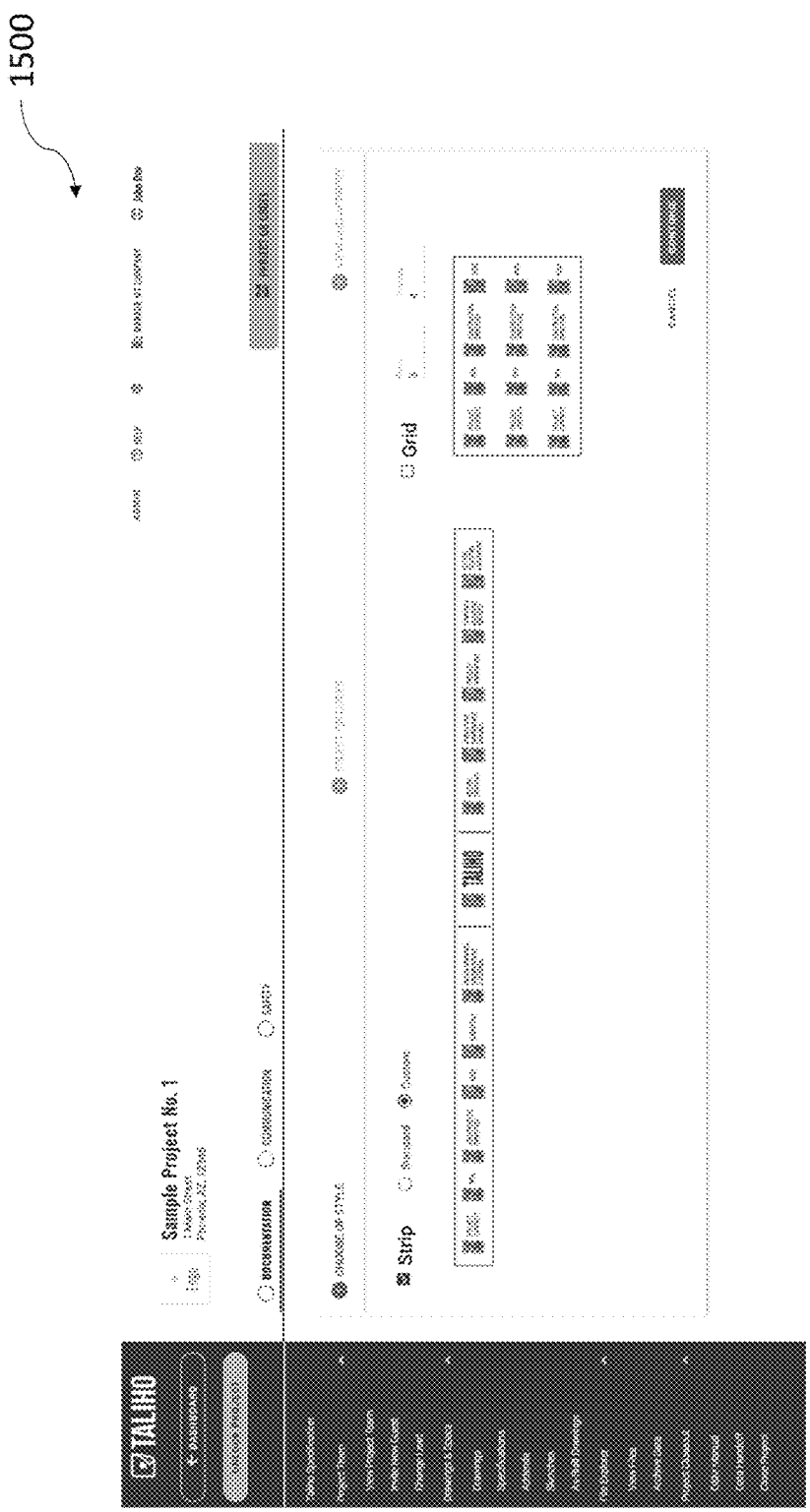
FIG. 15 shows a screenshot of one embodiment of a computer program to create an arranged plurality of barcodes.
Figure 16:
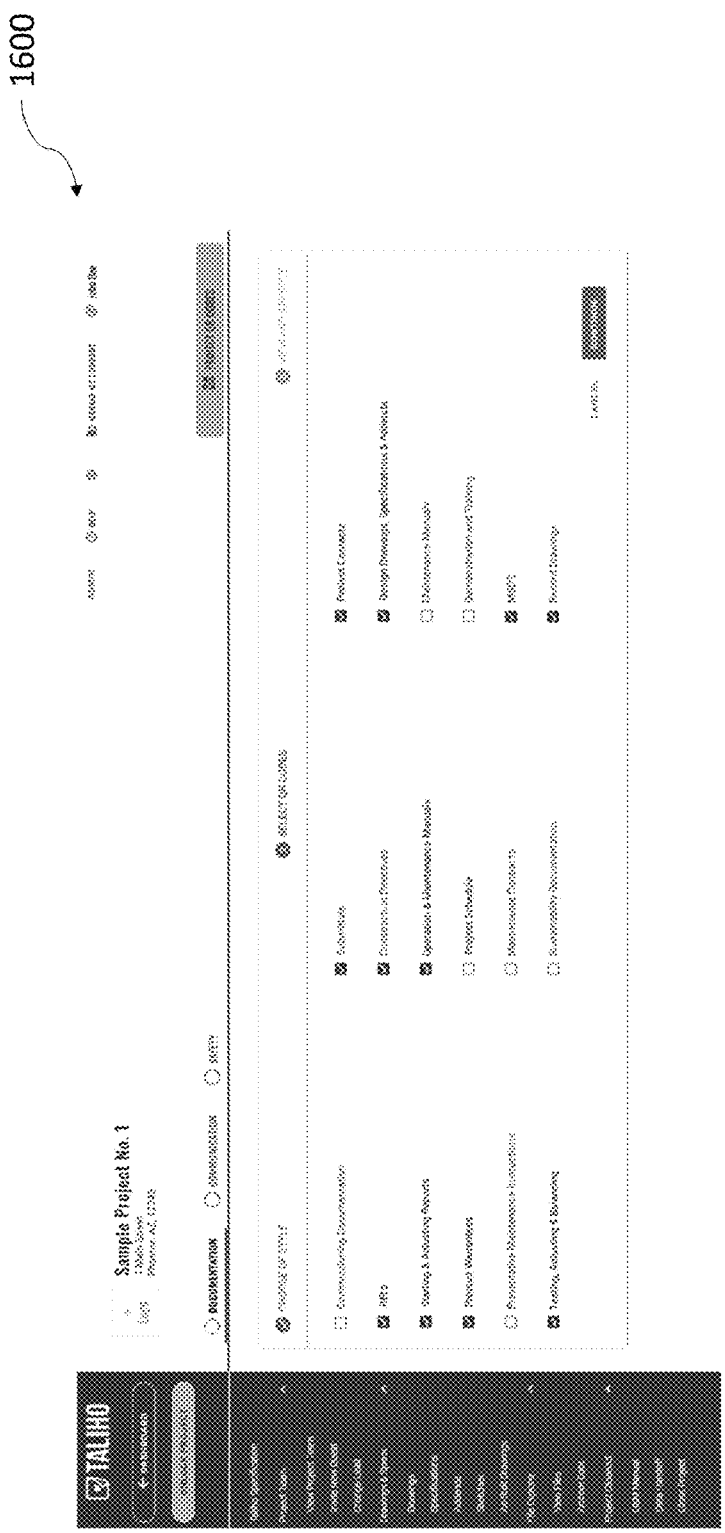
FIG. 16 shows a screenshot of one embodiment of a computer program to create an arranged plurality of barcodes.
Figure 17:
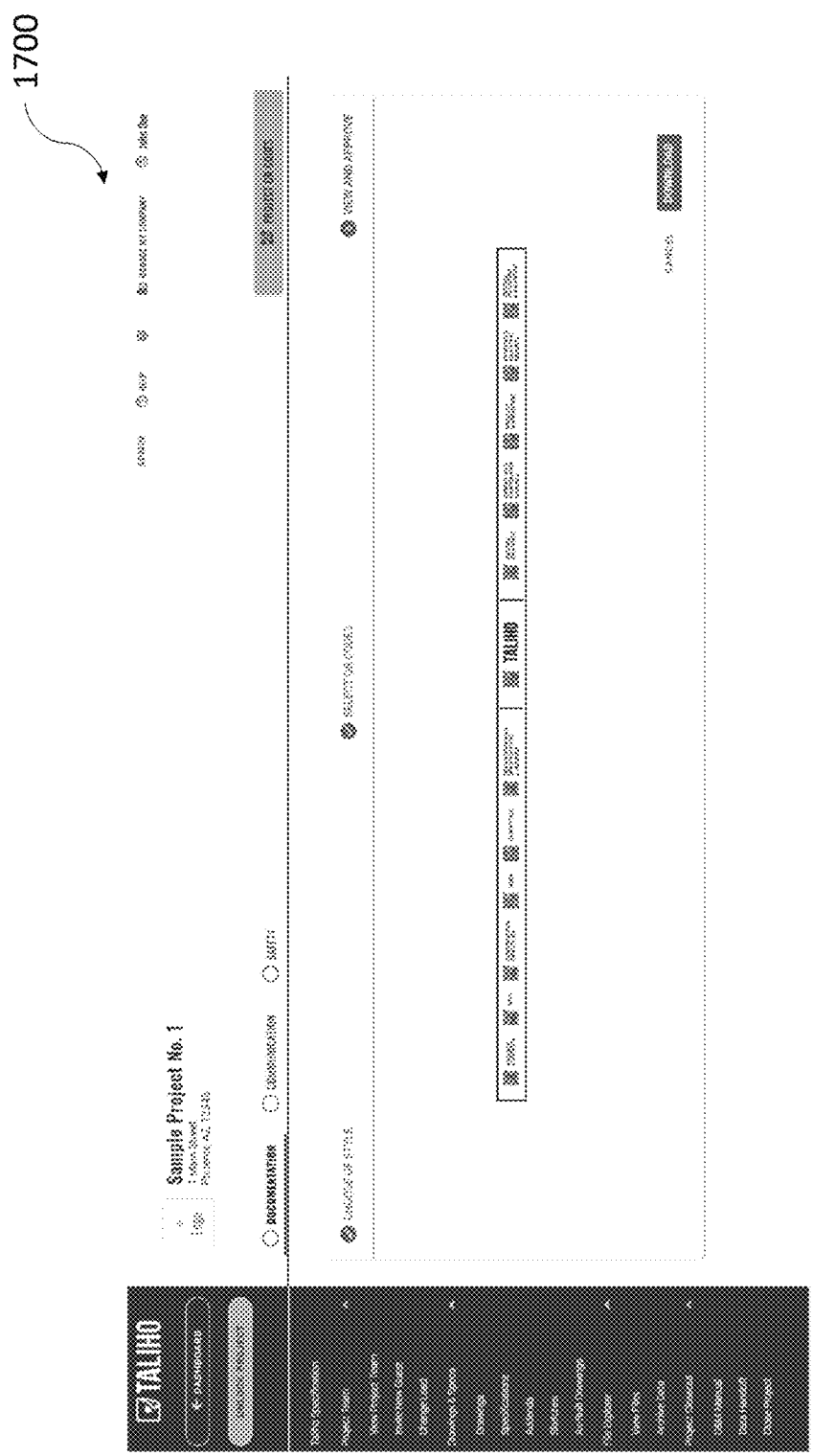
FIG. 17 shows a screenshot of one embodiment of a computer program to create an arranged plurality of barcodes.

FIGS. 15-17 show screenshots of a web application according to embodiments of the claimed invention. FIG. 15 shows a screenshot 1500 of a web application depicting steps 1404, 1406, and 1408, of method 1400 in FIG. 14. In the present embodiment, screenshot 1500 shows a web application interface that allows a user to select a barcode arrangement style—e.g., a strip of barcodes or a grid of barcodes. The user may select a pre-determined canvas (i.e., layout) template in the form of a strip/grid, or may customize the canvas template to choose, for example, position of barcodes relative to each other. FIG. 16 shows a screenshot 1600 of a web application depicting steps 1410 and 1412 of method 1400 in FIG. 14. In the present embodiment, screenshot 1600 shows a web application that allows a user to select one or more barcodes through a check box widget displayed proximate to a barcode identifier. The barcode identifier may be based on barcode metadata, such as a label indicative of a unique web resource encoded within. FIG. 17 shows a screenshot 1700 of a web application depicting steps 1414 and 1416 of method 1400 in FIG. 14. In the present embodiment, screenshot 1700 shows a web application displaying a strip of two-dimensional barcodes based on the user's template and barcode selections. The user may tdownload, transmit, save, or revise the output.

Figure 18:
FIG. 18 shows a construction document with an arranged plurality of barcodes according to embodiments.

FIG. 18 shows a design document 1800 that includes an arranged plurality of 2D barcodes (i.e., layout) affixed along the top according to embodiments. In the present embodiment, the design document 1800 was creating using method 1400 of FIG. 14. Alternative methods or steps may be useful to create design document 1800.

Figure 19:
FIG. 19 shows a mobile phone accessing a web application in response to scanning a barcode according to embodiments.

FIG. 19 shows a mobile computing device 1900 accessing a web application in response to scanning a barcode generated according to embodiments of the claimed invention. In the present embodiment, mobile computing device 1900 scans a barcode that directs said device to a "Submittal" page of the web application for "Sample Project No. 1."

FIG. 1 depicts a computing system 10 that may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the instruction system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

It is understood that instruction system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 2:
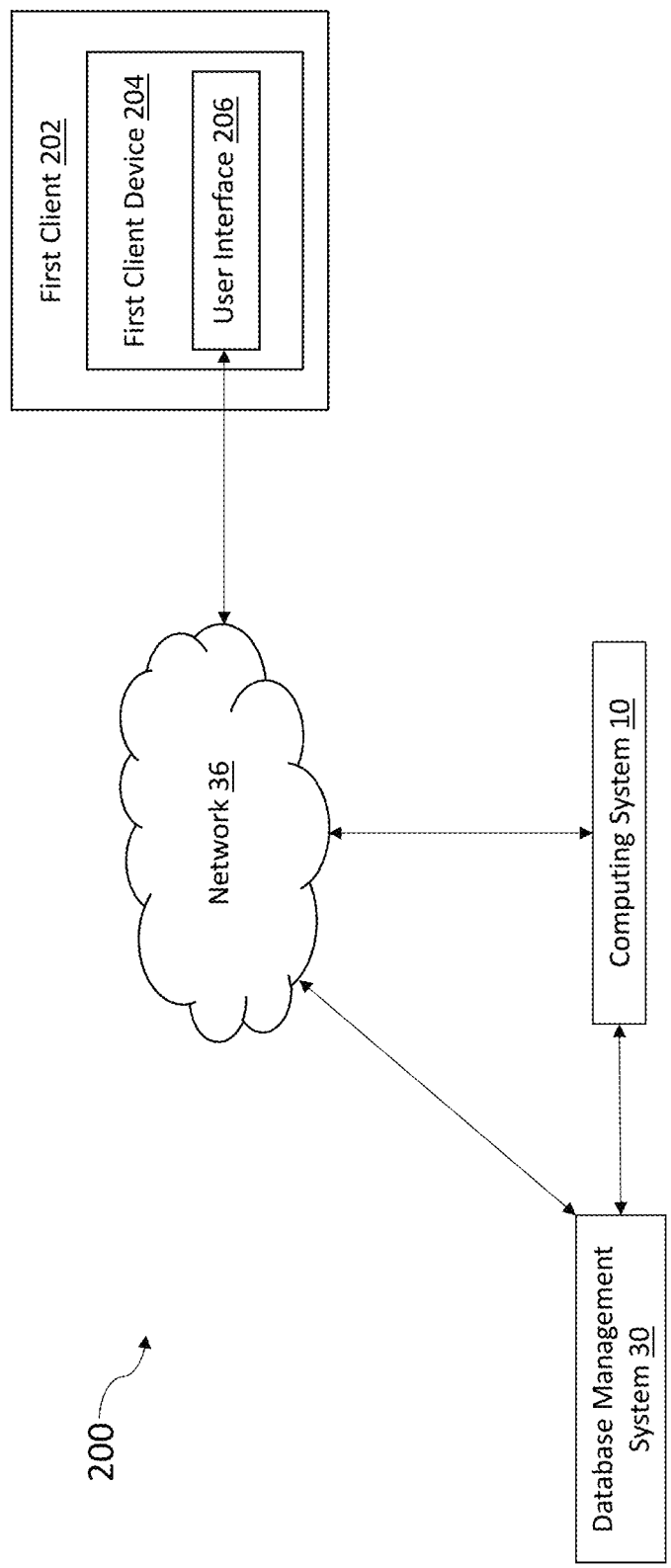
FIG. 2 shows a client accessing a computing system and related components according to embodiments.

FIG. 2 depicts a flow diagram of a first client 202 interacting with a network 36 through a first client device 204 through a user interface 206. In the present embodiment, the user interface 206 is a web application that is accessible through the network 36. The computer program product may be stored and executed by computing system 10. The web application relies on data stored in database management system 30. The first client 202 interacts with the first client device 204 to access the web application through user interface 206. The web application, accessed through user interface 206, allows the first client to access resources on computing system 10 and database management system 30.

Figure 3:
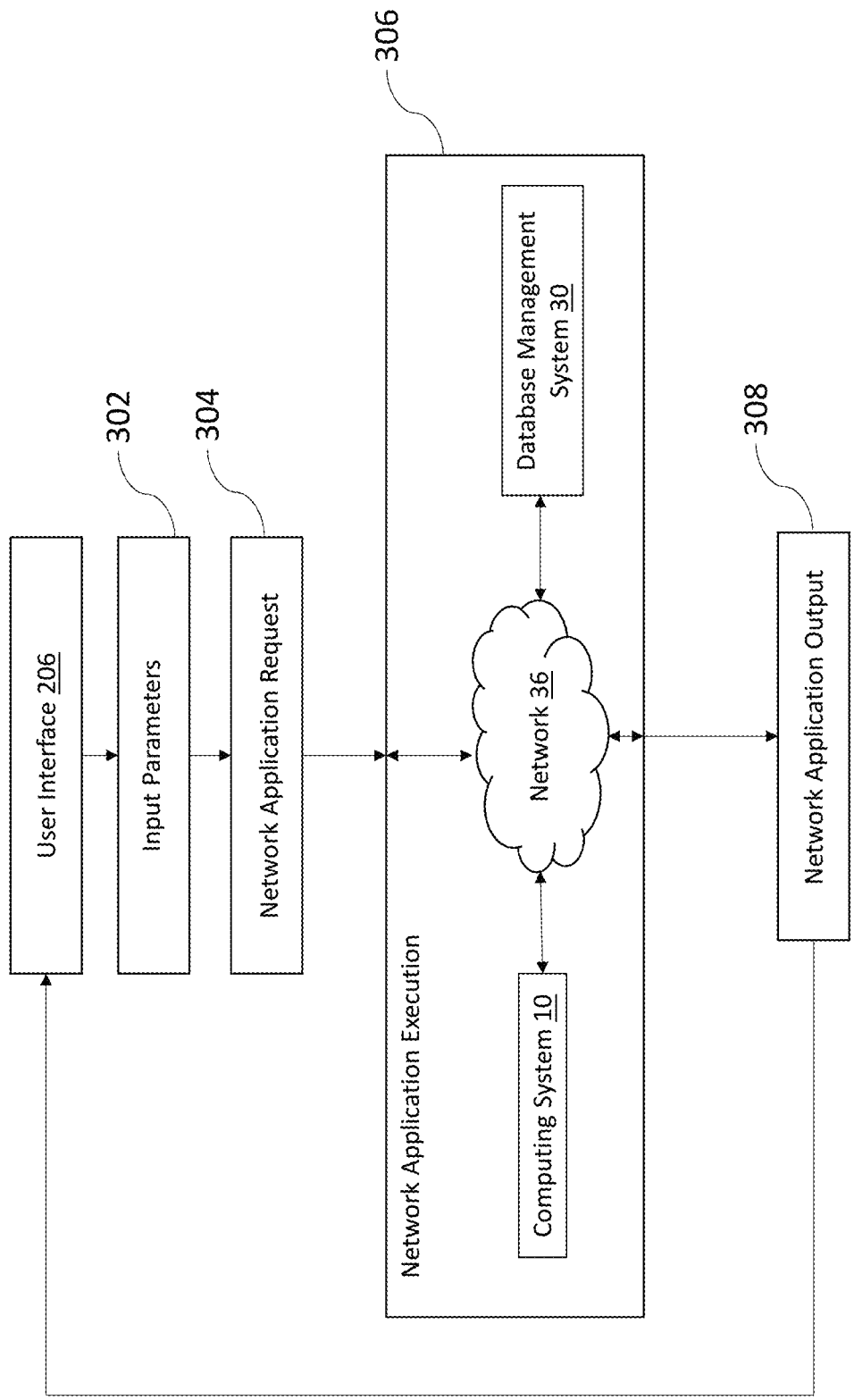
FIG. 3 shows a client executing actions on a computing system and related components according to embodiments.

FIG. 3 depicts a flow diagram of a first client 202 of FIG. 2 (not shown) interaction with user interface 206. In the present embodiment, the first client 202 accesses the user interface 206. The first client 202 inputs and/or selects a plurality of input parameters 302 of FIG. 3 through user interface 206. The input parameters 302 are parsed and/or formatted as a network application request 304. The network application request 304 is sent to network 36 to carry out a network application execution 306. The network application execution 306 is further comprised of network 36, computing system 10, and database management system 30. The network application execution utilizes a computer program, or plurality of computer programs, that are stored and carried out by computing system 10. The computer program, or plurality of computer programs, utilizes one or more aspects of the database management system 30 to facilitate the network application execution 306. Subsequently, the network application execution 306 generates a network application output 308 through network 36 through database management system 30 through computing system 10. The network application output 308 is the response returned based on the network application request 304 generated by input parameters 302 and carried out by network application execution 306. The network application output 308 is transmitted and available to the first client 202 through the user interface 206.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method, comprising:
    creating a construction project associated with a construction of a structure according to a set of design documents, wherein the construction project includes a plurality of barcode categories selectable by a user, at least one of the barcode categories includes a documentation category, at least one of the barcode categories includes a communication category, and at least one of the barcode categories includes a safety category;
    generating a plurality of two-dimensional (2D) barcodes grouped into the plurality of barcode categories for the construction project, wherein each of the barcodes provides a link to a resource associated with the construction of the structure, wherein at least a first one of the 2D barcodes includes a documentation barcode associated with a location for storing construction files and grouped in the documentation category, wherein construction files are uploaded to the location via a web interface, wherein at least a second one of the 2D barcodes includes a communication barcode grouped in the communication category, and wherein at least a third one of the 2D barcodes includes a safety barcode grouped in the safety category;
    defining a single page layout and populating the layout with the plurality of 2D barcodes grouped into the plurality of barcode categories, wherein barcode categories in the single page layout include the documentation category, the communication category, and the safety category and wherein the layout is configured to include a first region for displaying the plurality of 2D barcodes grouped into the plurality of barcode categories, each of the barcode categories including a label for the category displayed in the layout, and a second region for displaying at least one page of a design document of the set of design documents;

outputting and transmitting a digital file containing the layout;

attaching the layout of the transmitted digital file to the at least one page of the design document of the set of design documents to form a composite single page layout, the design document created by a design professional to assist construction personnel in carrying out a task or collection of tasks related to the construction project; and loading a web application on a mobile computing device in response to a remote user scanning one of the plurality of 2D barcodes presented in the composite single page layout with the mobile computing device, wherein scanning of the documentation barcode provides access to the uploaded construction files via the web application, scanning of the communication barcode triggers a two-way communication between the remote user and a third party through a graphical user interface of the web application, and scanning of the safety barcode provides access to safety information.

2. The computer-implemented method of claim 1, wherein populating the layout includes positioning each 2D barcode proximate to a barcode label, wherein the barcode label is indicative of a construction project task accessible via a unique web resource encoded within each 2D barcode.

3. The computer-implemented method of claim 1, wherein the documentation barcode is configured to trigger display of the construction files through a graphical user interface of the web application.

4. The computer-implemented method of claim 1, wherein at least one of the 2D barcodes includes a second communication barcode positioned in a communication region on the layout, and wherein the second communication barcode is configured to trigger a communication event through the graphical user interface of the web application, wherein the communication event is selected from a group consisting of requests for information, requests for proposals, payment application, and access to construction project directives.

5. The computer-implemented method of claim 1, wherein at least one of the 2D barcodes includes a second safety barcode positioned in a safety region on the layout, and wherein the second safety barcode is configured to trigger access to construction project safety content through the graphical user interface of the web application, wherein the construction project safety content is selected from a group consisting of material safety data sheets, daily logs, incident reports, construction safety videos, construction injury reports, site-specific safety standards, and third-party safety equipment procurement.

6. The computer-implemented method of claim 1, wherein at least one of the 2D barcodes is configured to trigger a solicitation of competitive bidding for a construction related service through a graphical user interface of the web application, wherein the construction related service is selected from the group consisting of acquiring construction materials, acquiring construction equipment, and hiring construction labor.

7. The computer-implemented method of claim 1, further comprising printing the digital file of the layout on a material that includes an adhesive backing.

8. A system comprising:
a memory; and
a processor coupled to the memory and configured to perform a process that includes:
creating a construction project associated with a construction of a structure according to a set of design documents, wherein the construction project includes a plurality of barcode categories selectable by a user, at least one of the barcode categories includes a documentation category, at least one of the barcode categories includes a communication category, and at least one of the barcode categories includes a safety category;

generating a plurality of two-dimensional (2D) barcodes grouped into the plurality of barcode categories for the construction project, wherein each of the barcodes provides a link to a resource associated with the construction of the structure, wherein at least a first one of the 2D barcodes includes a documentation barcode associated with a location for storing construction files and grouped in the documentation category, wherein construction files are uploaded to the location via a web interface, wherein at least a second one of the 2D barcodes includes a communication barcode grouped in the communication category, and wherein at least a third one of the 2D barcodes includes a safety barcode grouped in the safety category;

defining a single page layout and populating the layout with the plurality of 2D barcodes grouped into the plurality of barcode categories, wherein barcode categories in the single page layout include the documentation category, the communication category, and the safety category and wherein the layout is configured to include a first region for displaying the plurality of 2D barcodes grouped into the plurality of barcode categories, each of the barcode categories including a label for the category displayed in the layout, and a second region for displaying at least one page of a design document of the set of design documents;

outputting and transmitting a digital file containing the layout;

attaching the layout of the transmitted digital file to the at least one page of the design document of the set of design documents to form a composite single page layout, the design document created by a design professional to assist construction personnel in carrying out a task or collection of tasks related to the construction project; and loading a web application on a mobile computing device in response to a remote user scanning one of the plurality of 2D barcodes presented in the composite single page layout with the mobile computing device, wherein scanning of the documentation barcode provides access to the uploaded construction files via the web application, scanning of the communication barcode triggers a two-way communication between the remote user and a third party through a graphical user interface of the web application, and scanning of the safety barcode provides access to safety information.

9. The system of claim 8, wherein the layout includes a category region for each barcode category selected by the user.

10. The system of claim 8, wherein populating the layout includes positioning each 2D barcode proximate to a barcode label, wherein the barcode label is indicative of a construction project task accessible via a unique web resource encoded within each 2D barcode.

11. The system of claim 8, wherein the documentation barcode is configured to trigger display of the construction files through a graphical user interface of the web application, wherein the construction files include at least one of construction design drawings, construction specifications, construction addenda, construction record drawings, approved equipment submittals, construction equipment operations and maintenance manuals, construction equipment start-up reports, construction equipment demonstration and training reports, construction equipment spare parts, construction equipment preventative maintenance instructions, construction balancing reports, construction material safety data sheets, construction commissioning checklists, construction associated sustainability-related documentation, and construction equipment warrantees.

12. The system of claim 8, wherein at least one of the 2D barcodes includes a second communication barcode positioned in a communication region on the layout, and wherein the second communication barcode is configured to trigger a communication event through the graphical user interface of the web application, wherein the communication event is selected from a group consisting of requests for information, requests for proposals, payment application, and access to construction project directives.

* * * * *